US010723570B2

(12) United States Patent
Morfino et al.

(10) Patent No.: US 10,723,570 B2
(45) Date of Patent: Jul. 28, 2020

(54) PALLET CHANGING SYSTEM FOR A MACHINE TOOL

(71) Applicant: FIDIA S.p.A., San Mauro Torinese (Turin) (IT)

(72) Inventors: Giuseppe Morfino, Pino Torinese (IT); Giacomo Bene, Santa Colomba di Bientina (IT)

(73) Assignee: FIDIA S.P.A., San Mauro Torinese (IT)

( * ) Notice: Subject to any disclaimer, the term of this patent is extended or adjusted under 35 U.S.C. 154(b) by 267 days.

(21) Appl. No.: 15/962,855

(22) Filed: Apr. 25, 2018

(65) Prior Publication Data

US 2018/0312349 A1 Nov. 1, 2018

(30) Foreign Application Priority Data

Apr. 27, 2017 (IT) .......................... 102017000045614

(51) Int. Cl.
*B65G 65/00* (2006.01)
*B23Q 7/14* (2006.01)
(Continued)

(52) U.S. Cl.
CPC ......... *B65G 65/005* (2013.01); *B23Q 7/1431* (2013.01); *B65G 1/0407* (2013.01); *B65G 2201/0267* (2013.01); *Y10T 29/5196* (2015.01)

(58) Field of Classification Search
CPC .......... B23Q 7/00; B23Q 7/001; B23Q 7/005; B23Q 7/035; B23Q 7/14; B23Q 7/1431; B23Q 7/1447; B23Q 7/16
(Continued)

(56) References Cited

U.S. PATENT DOCUMENTS

2009/0252587 A1 10/2009 Mischler
2015/0298916 A1* 10/2015 Susnjara .................. B27M 1/08
414/758

FOREIGN PATENT DOCUMENTS

EP 1084794 A1 * 3/2001 ............. B23Q 1/488
EP 1295674 A1 3/2003

OTHER PUBLICATIONS

International Search Report in IT102017000045614 dated Jan. 11, 2018.

* cited by examiner

*Primary Examiner* — Orlando E Aviles
*Assistant Examiner* — Khawaja H Samiullah
(74) *Attorney, Agent, or Firm* — Henry J. Cittone; Cittone Demers & Arneri LLP

(57) ABSTRACT

The pallet changing system comprises a pallet deposition and pick-up station and a pallet loading and unloading station, horizontally spaced from one another along a first horizontal direction (A-A), as well as a pallet handling unit. The pallet handling unit includes: horizontal guide means extending along the first horizontal direction (A-A) between the pallet deposition and pick-up station and the pallet loading and unloading station; a pair of motorized uprights, which are jointly movable in a controlled manner in the first horizontal direction (A-A) between the pallet deposition and pick-up station and the pallet loading and unloading station, each upright being provided with a respective motorized lifting carriage vertically movable in a controlled manner, each lifting carriage being provided with a pair of gripping devices which are horizontally spaced from one another and selectively or jointly controllable to engage a corresponding end of a pallet (P) so as to allow rotation of the pallet (P) about a first horizontal axis; a pair of motorized auxiliary carriages, which are jointly movable in the first horizontal
(Continued)

direction (A-A) between the pallet deposition and pick-up station and the pallet loading and unloading station, and are provided each with a gripping device arranged to engage a corresponding end of the pallet (P) facing the pallet deposition and pick-up station, so as to allow rotation of the pallet (P) about the first horizontal axis; and a motorized transporting carriage which is arranged to transport, in a vertical attitude, the pallet (P) with the workpiece (WP) connected thereto, and is movable between the pallet loading and unloading station and a working area (SW) of the machine tool (MT) in a second horizontal direction (B-B) forming an angle with respect to the first horizontal direction (A-A).

7 Claims, 16 Drawing Sheets

(51) Int. Cl.
    *B65G 1/04*         (2006.01)
    *B23Q 1/52*         (2006.01)

(58) Field of Classification Search
    USPC ........ 29/281.1, 281.3, 281.4, 281.5; 23/33 P, 23/563
    See application file for complete search history.

PALLET CHANGING SYSTEM FOR A MACHINE TOOL

CROSS-REFERENCE TO RELATED APPLICATION

This application claims priority to Italian Pat. App. No. 102017000045614 filed on Apr. 27, 2017, the disclosures of which is hereby incorporated by reference in its entirety.

BACKGROUND OF THE INVENTION

The present invention relates to a pallet changing system intended to be associated with a machine tool for changing pallets carrying workpieces to be machined by the machine tool.

Such pallet changing systems are known for example from EP 1 295 674 A1 and US 2009/252587 A1.

SUMMARY OF THE INVENTION

It is an object of the present invention to provide an improved pallet changing system with respect to the above-mentioned prior art.

This and other objects are fully achieved according to the present invention by virtue of a pallet changing system comprising:
a pallet deposition and pick-up station and a pallet loading and unloading station, which are spaced apart from each other horizontally along a first predetermined direction;
a pallet handling unit including
horizontal guides extending along said first predetermined direction between the pallet deposition and pick-up station and the pallet loading and unloading station,
a pair of motorized uprights, which are jointly movable in a controlled manner along said horizontal guides between said stations, each upright being provided with a respective motorized lifting carriage, which is vertically movable in a controlled manner, each of the lifting carriages being provided with a respective pair of gripping devices, which are horizontally spaced apart from each other and are selectively or jointly controllable to releasably engage a corresponding end of a pallet so as to allow rotation of the pallet about a first horizontal axis,
first and second motorized auxiliary carriages, which are jointly movable along said horizontal guides between said stations and are each provided with a respective gripping device arranged to releasably engage a corresponding end, facing the pallet deposition and pick-up station, of a pallet carried by the uprights, so as to allow rotation of the pallet about a second horizontal axis parallel to said first horizontal axis, and
a motorized transporting carriage arranged to carry and transport, in a vertical attitude, a pallet with a workpiece connected thereto, said transporting carriage being movable between the pallet loading and unloading station and a working area of the machine tool along a second horizontal direction forming an angle with said first horizontal direction; and
an electronic control unit arranged to control the uprights, the lifting carriages, the auxiliary carriages and the transporting carriage according to predetermined operating modes, so as to carry out at least the following phases:
a first transfer phase wherein the uprights, by means of the respective lifting carriages, pick a pallet, along with the associated workpiece, from the pallet deposition and pick-up station and transfer the same, in a horizontal attitude, to the pallet loading and unloading station,
a loading phase wherein, by means of the lifting carriages and the auxiliary carriages, the pallet that has been transferred to the pallet loading and unloading station is rotated from horizontal to vertical and loaded onto the transporting carriage in a vertical attitude,
an outward transport phase wherein the transporting carriage transfers the pallet with the associated workpiece, in a vertical attitude, to the working area of the machine tool,
a return transport phase wherein the transporting carriage transfers the pallet with the associated machined workpiece from the working area of the machine tool to the pallet loading and unloading station,
an unloading phase wherein the uprights, by means of the respective lifting carriages, pick the pallet with the associated machined workpiece from the transporting carriage and, in cooperation with the auxiliary carriages, cause rotation of the pallet from vertical to horizontal, and
a second transfer phase wherein the uprights, by means of the respective lifting carriages, transfer the pallet with the associated machined workpiece, in a horizontal attitude, to the pallet deposition and pick-up station.

In an embodiment of the invention, the pallet changing system may comprise a stationary bearing structure which is arranged between the pallet deposition and pick-up station and the pallet loading and unloading station and includes a rack having a plurality of horizontal support shelves which are placed vertically one over the other and are each arranged to receive and carry, in a horizontal attitude, a respective pallet with the associated workpiece to be machined by the machine tool.

BRIEF DESCRIPTION OF THE DRAWINGS

Further features of the pallet changing system according to the present invention will become apparent from the following detailed description, given purely by way of non-limiting example with reference to the appended drawings, wherein.

DETAILED DESCRIPTION OF EMBODIMENTS OF THE INVENTION

Figure 1:
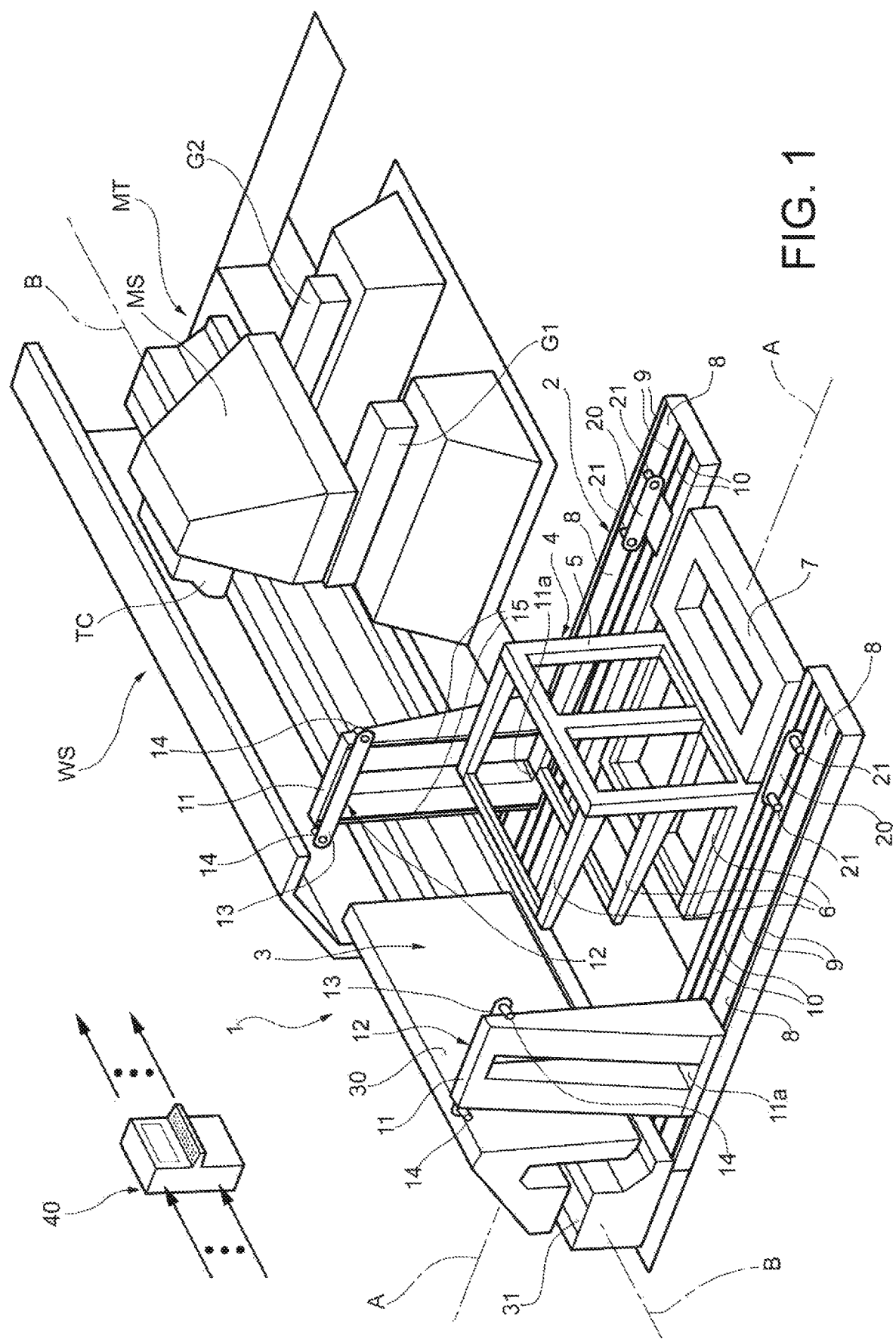
FIG. 1 is a perspective view showing a pallet changing system according to the present invention and a machine tool associated therewith.
Figure 2:
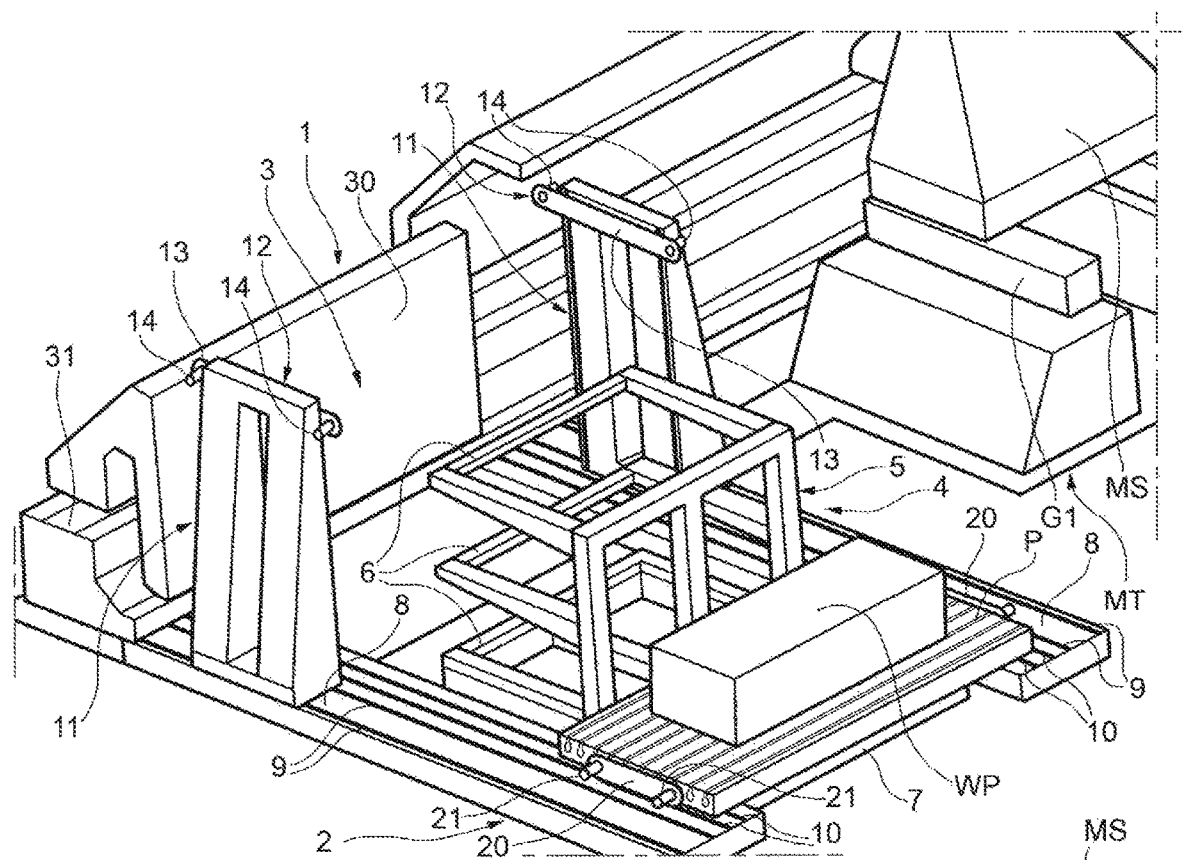
FIGS. 2 and 3 are perspective views of the pallet changing system of FIG. 1 during two consecutive phases of the operating cycle of the system.

In the drawings, and more specifically in FIG. 1, reference numeral 1 generally indicates a pallet changing system according to the present invention, which is associated to a machine tool MT and, more specifically, is placed close to a working area WS of the machine tool MT.

The machine tool MT may be for example of the type illustrated and described in Italian Patent application No. 102016000101422 in the Applicant's name.

In the illustrated embodiment, the machine tool MT is a milling machine comprising a movable structure MS which, in a vertically intermediate portion thereof, is supported on parallel guides G1 and G2 so as to be movable horizontally. A tool-carrying unit TC is mounted on the movable structure MS so as to be vertically slidable relative to the movable structure MS.

The pallet changing system 1 comprises a pallet deposition and pick-up station 2 as well as a pallet loading and unloading station 3, hereinafter also referred to simply as station 2 and station 3, respectively. The stations 2 and 3 are horizontally spaced apart from one another along a first horizontal direction indicated at A-A in FIG. 1.

The pallet changing system 1 further comprises a bearing structure 4, which is stationary in use and is arranged between the stations 2 and 3. In the illustrated embodiment, the bearing structure 4 includes a rack 5 having a plurality of horizontal support shelves 6 which are placed vertically one over the other. The presence of such a bearing structure is however purely optional. In the illustrated embodiment, the support shelves 6 are made as essentially rectangular frames and are each arranged to receive and a carry, in a horizontal attitude, a respective pallet P carrying a workpiece WP intended to be machined by the machine tool MT. The bearing structure 4 further comprises a horizontal base frame 7, of essentially rectangular shape, which is placed in the pallet deposition and pick-up station 2 and is connected to the rack 5 on the side thereof opposite to the pallet loading and unloading station 3. The base frame 7 advantageously extends at essentially the same level as the lowermost support shelf 6 of the rack 5.

Two horizontal guides 8, extending parallel to each other and to the first horizontal direction A-A (FIG. 1), are mounted on the ground on opposite sides of the bearing structure 4 from the pallet deposition and pick-up station 2 to the pallet loading and unloading station 3.

In the illustrated embodiment, each horizontal guide 8 has a respective pair of first guide grooves 9 and a respective pair of second guide grooves 10, parallel to each other. The arrangement of the guide grooves 9 and 10 in one horizontal guide 8 is essentially symmetrical to the arrangement of the guide grooves 9 and 10 in the other horizontal guide 8. Instead of respective pairs of first and second guide grooves 9 and 10, the two horizontal guides 8 may be provided with respective pairs of first and second guide rods or bars.

The pallet changing system 1 further comprises a pallet handling unit for moving the pallets P, along with the associated workpieces WP connected thereto, between the stations 2 and 3.

The pallet handling unit comprises first of all two motorized uprights 11 which are arranged one in front of the other along a second horizontal direction B-B (FIG. 1) forming an angle, preferably a right angle, with the first horizontal direction A-A.

In the illustrated embodiment, each upright 11 has a substantially inverted U-shaped configuration. Each upright 11 is fixed to a base 11a (FIGS. 1 and 29) which is slidably mounted on the pair of first guide grooves 9 of the respective horizontal guide 8 for sliding movement in the first horizontal direction A-A. The uprights 11 are provided with motors (not shown, but of per-se-known type), such as for example electric motors, operable to drive the sliding movement of the uprights 11 along the horizontal guides 8. More specifically, said motors are controlled to jointly move the uprights 11 between the stations 2 and 3 so that the uprights 11 always remain in facing relationship with one another.

Each upright 11 is further provided with a respective motorized lifting carriage 12, which is vertically movable in a controlled manner under control of a motor (also not shown, but of per-se-known type), such as for example an electric motor. Each lifting carriage 12 comprises a horizontal arm 13 which is provided at its opposite ends with respective gripping devices 14 for releasably engaging a corresponding end of a pallet P, as will be better explained later. The lifting carriages 12 are jointly movable in the vertical direction, along respective pairs of vertical guides 15, of which only those of one of the two uprights 11 are visible in the drawings (see for example FIGS. 1 and 29).

Figure 4:
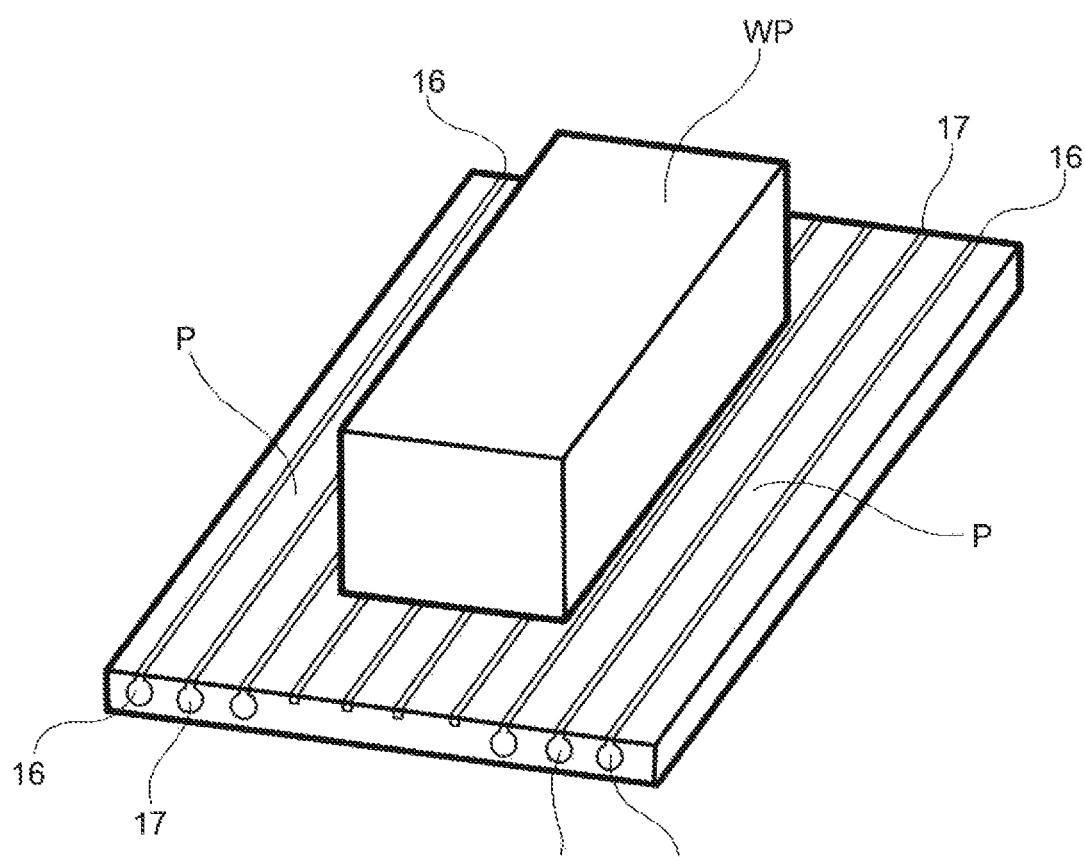
FIG. 4 is a perspective view showing a pallet with a workpiece to be machined arranged thereon.

With reference in particular to FIG. 4, each pallet P has on two opposite sides thereof at least one pair of transversely outer holes 16 and at least one pair of transversely inner holes 17. The holes 16 and 17 provided on one side of the pallet P are axially aligned with the corresponding holes 16 and 17 provided on the opposite side of the pallet P. The holes 16 and 17 might also be made as downwardly opened slots.

Figure 5:
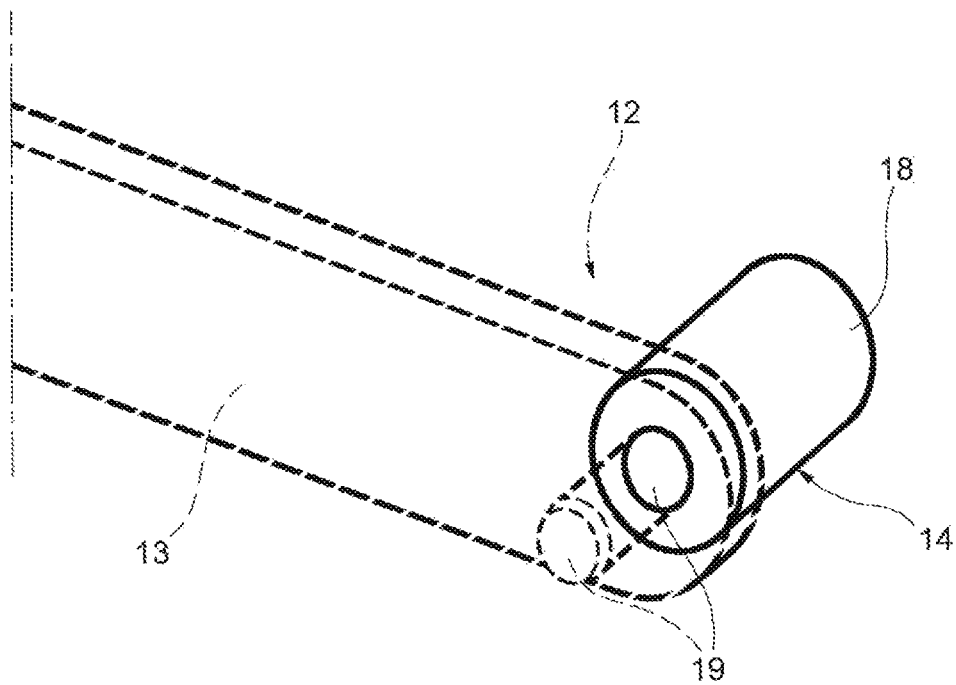
FIG. 5 is a perspective view showing a gripping device of the pallet changing system of FIG. 1.

With reference to FIG. 5, each gripping device 14 basically comprises a casing or housing 18 fixed to the horizontal arm 13 of the respective lifting carriage 12. A rod 19 is mounted in the casing 18 so as to be axially movable, for example by means of an electric, electromagnetic, hydraulic or electro-hydraulic actuation device, between a retracted position, as shown in solid line in FIG. 5, and an extended position, as shown in dashed line in FIG. 5. In the extended position, the rod 19 of each gripping device 14 extends through a corresponding through opening of the horizontal arm 13 of the respective lifting carriage 12 and protrudes from the latter. The cross-section of the rod 19 of each gripping device 14 is such that the rod 19 can be inserted into one of the holes 16 of the pallet P. As explained further below, the engagement of the rods 19 in the holes 16 of the pallet P is such as to allow, in certain phases of the operating cycle of the pallet changing system 1, rotation of the pallet P about the axis of a pair of opposed rods 19. The distance between the axes of the rods 19 of the gripping devices 14 of the same lifting carriage 12 is equal to the distance between the axes of the holes 16 on the same side of the pallet P.

Figure 3:
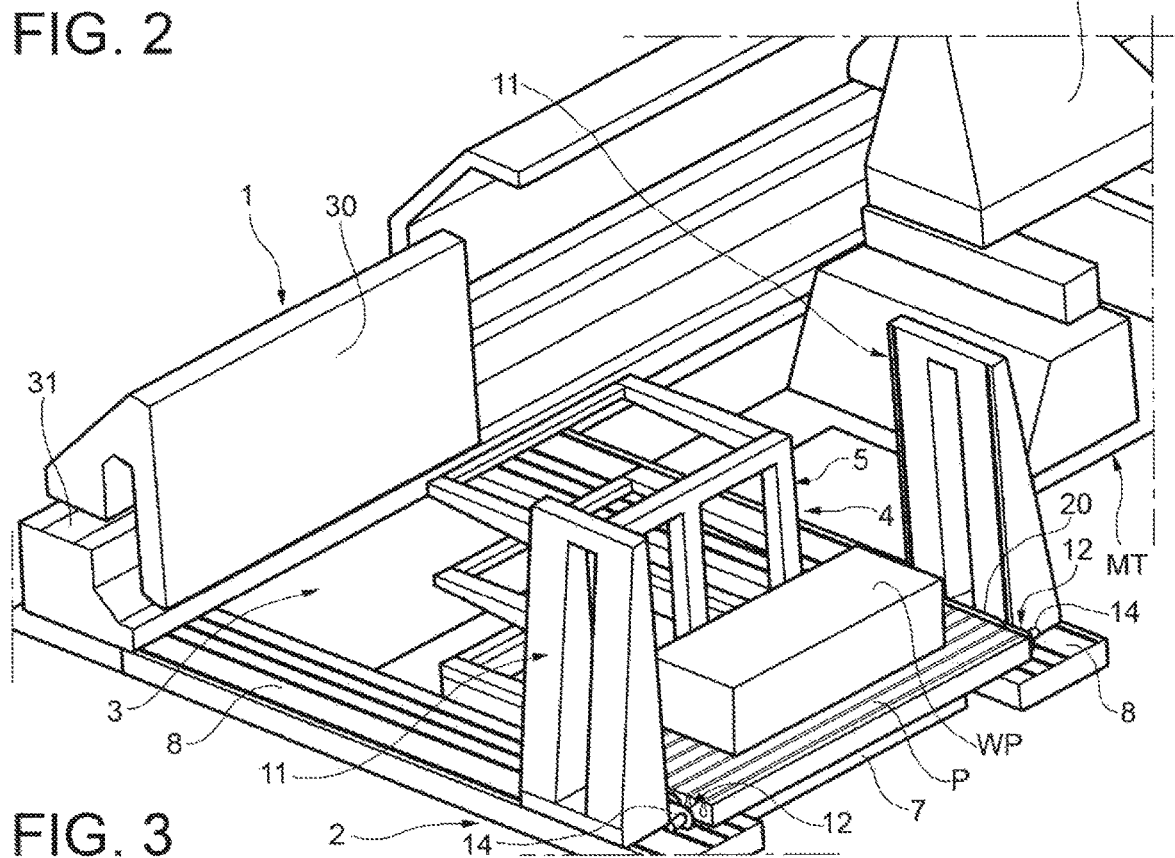

The arrangement is such that when the uprights 11 are placed in the pallet deposition and pick-up station 2, as shown in FIG. 3, the lifting carriages 12 can be lowered with the rods 19 of their gripping devices 14 in the retracted position, whereby the rods 19 can be brought in aligned and facing relationship with the corresponding holes 16 of the pallet P that is positioned on the base frame 7 of that station.

Figure 6:
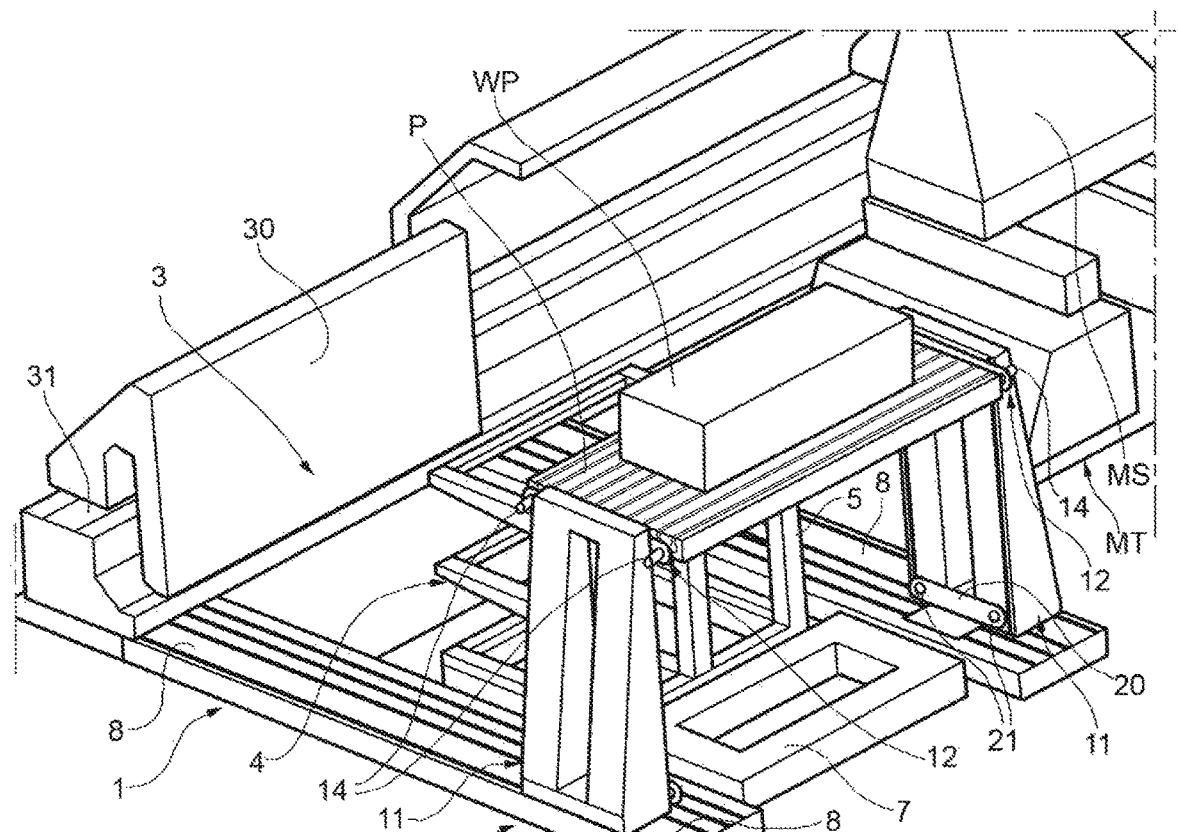

The gripping devices 14 of the uprights 11 can then be jointly activated so that their rods 19 move from the retracted position to the extended position, thereby engaging the holes 16 of the pallet P. Once this condition has been reached, the lifting carriages 12 can be moved vertically upwards along the uprights 11, so as to bring the pallet P, and therefore also the workpiece WP connected thereto, to a raised position, as shown in FIG. 6.

Figure 7:
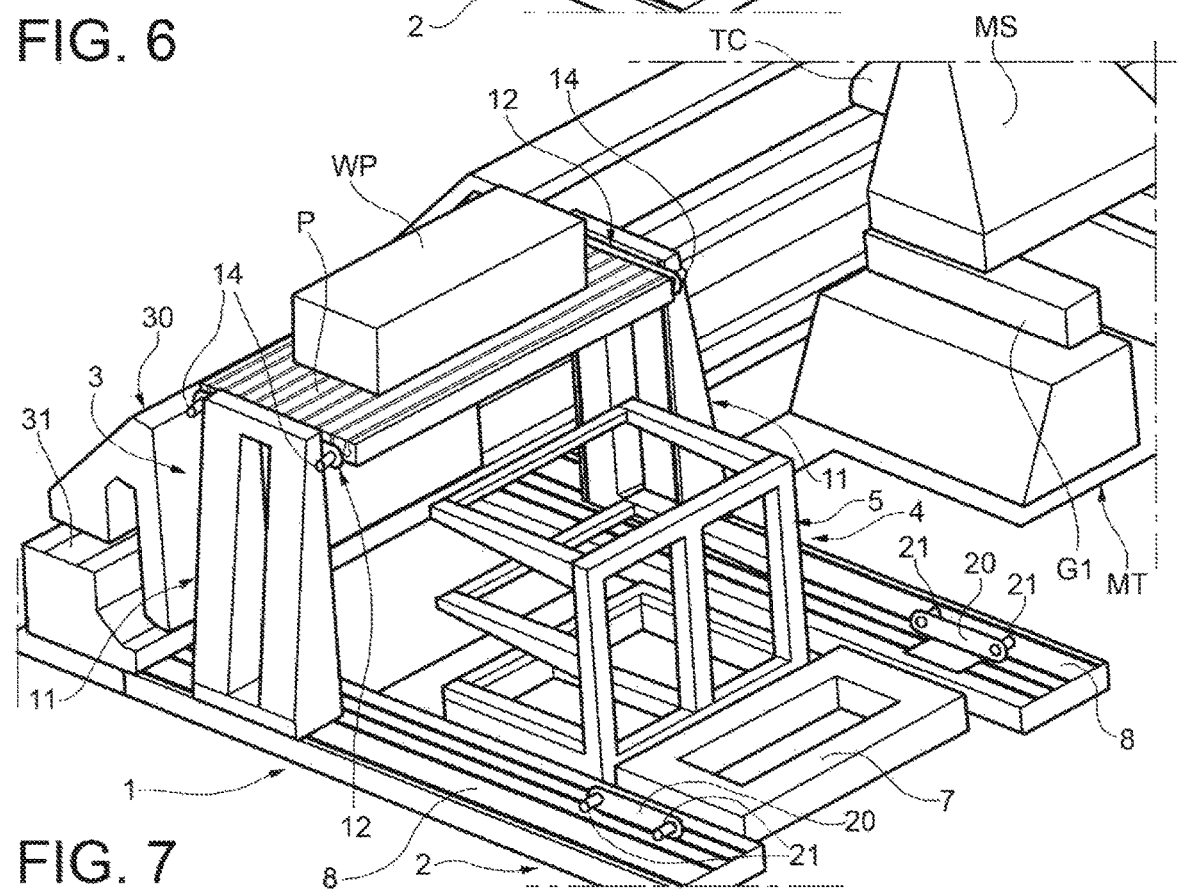
FIGS. 7 to 28 are perspective views like FIGS. 2 and 3, showing further phases of the operating cycle of the pallet changing system of the present invention.

In this position, the pallet P carried by the lifting carriages 12 is placed at a height greater than the maximum height of the bearing structure 4. The uprights 11 can thus be subsequently moved jointly from the pallet deposition and pick-up station 2 to the pallet loading and unloading station 3 in order to transfer the pallet P and the associated workpiece WP to the station 3, as shown in FIG. 7.

Figure 8:
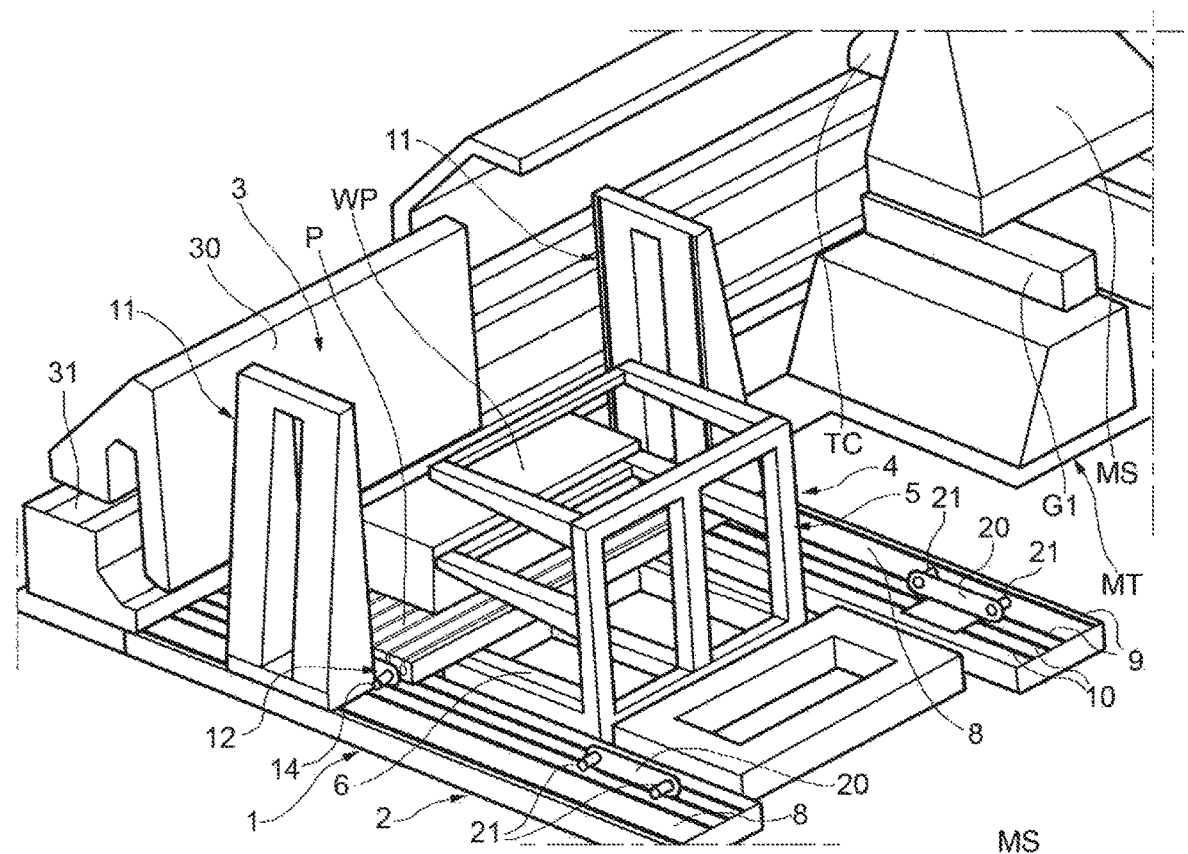
Figure 9:
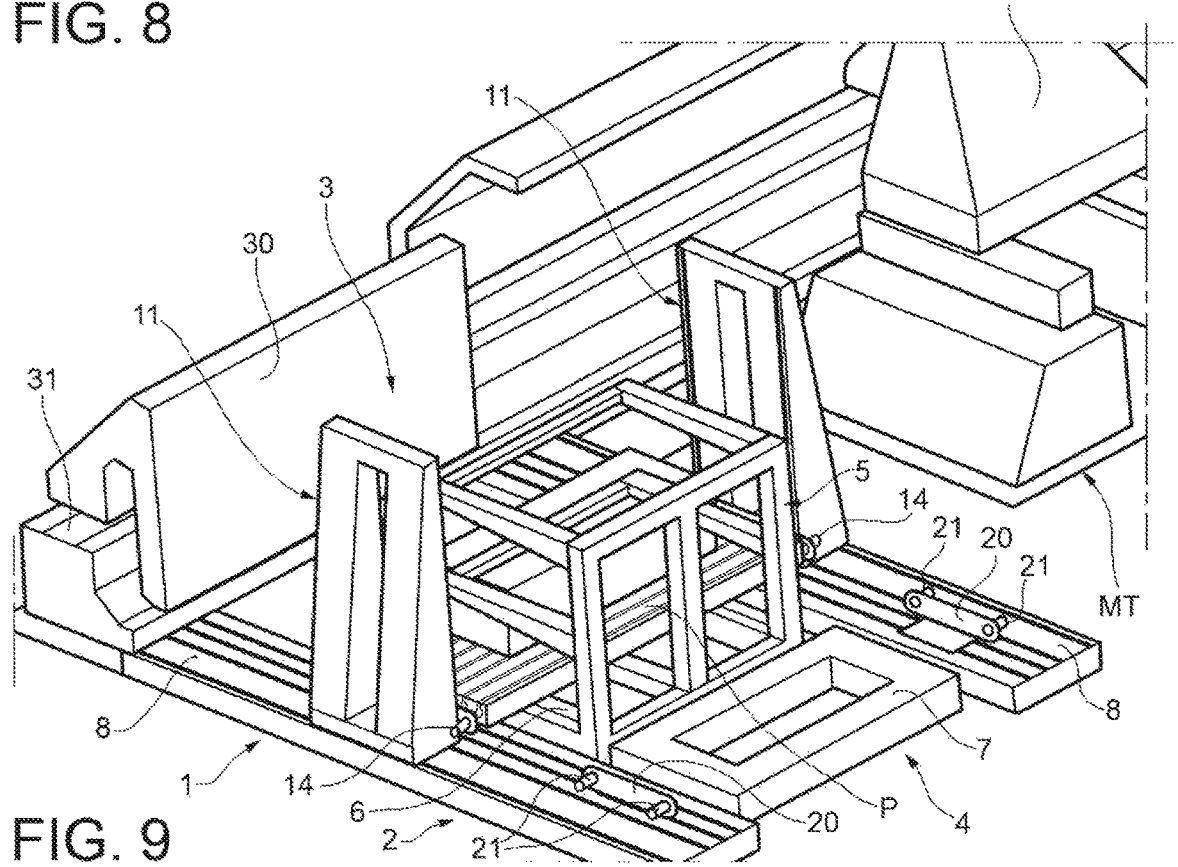

The lifting carriages 12 can then be jointly lowered, by translation along the vertical guides 15 of the uprights 11, in the pallet loading and unloading station 3, until they reach the position illustrated in FIG. 8, where the pallet P is at a height slightly greater than that of the lowermost support shelf 6 of the rack 5 of the bearing structure 4.

Figure 10:
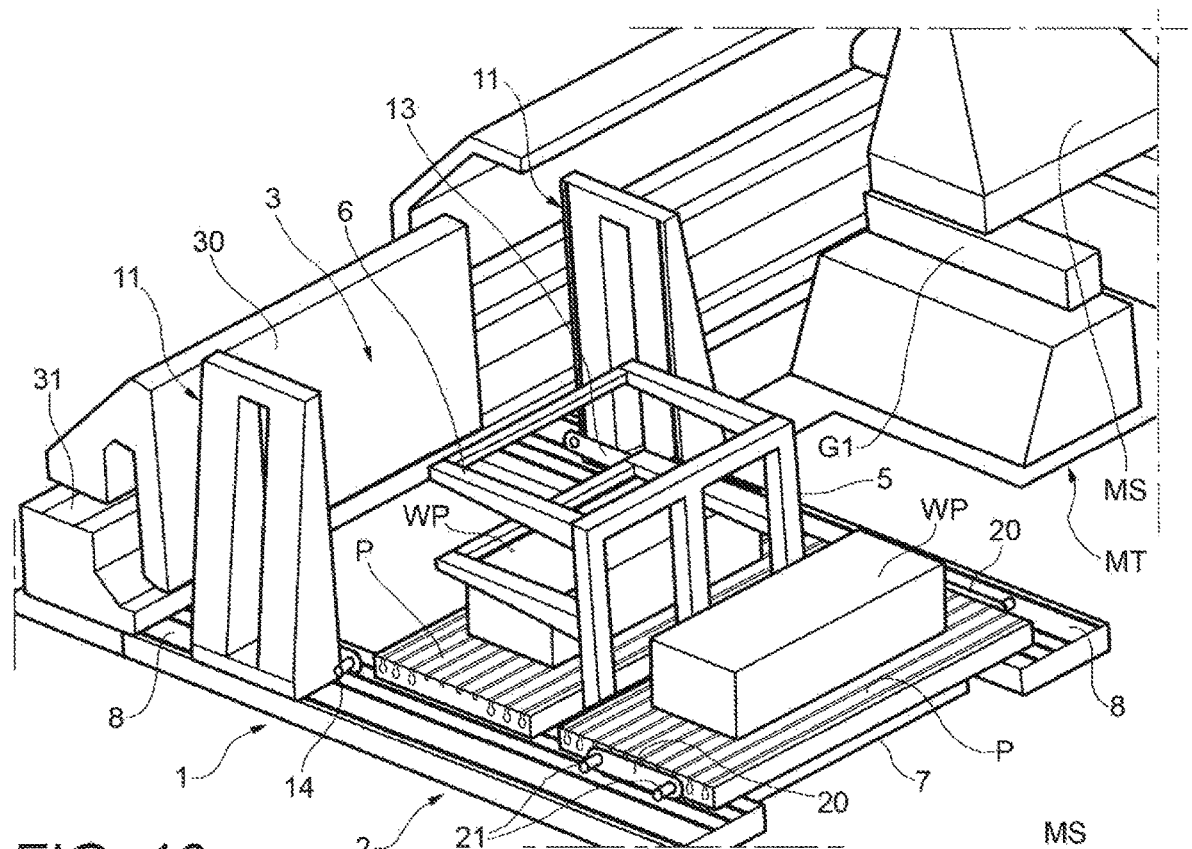

The uprights 11 can then be jointly moved towards the rack 5 of the bearing structure 4, in order to bring the pallet P and the associated workpiece WP above the lowermost support shelf 6 and allow them to be finally deposited on said shelf, as shown in FIG. 10.

During the above-described movements of the uprights 11, or subsequently, a new pallet P carrying a new workpiece WP to be machined can be placed on the base frame 7 of the bearing structure 4, as shown in FIG. 10.

Figure 11:
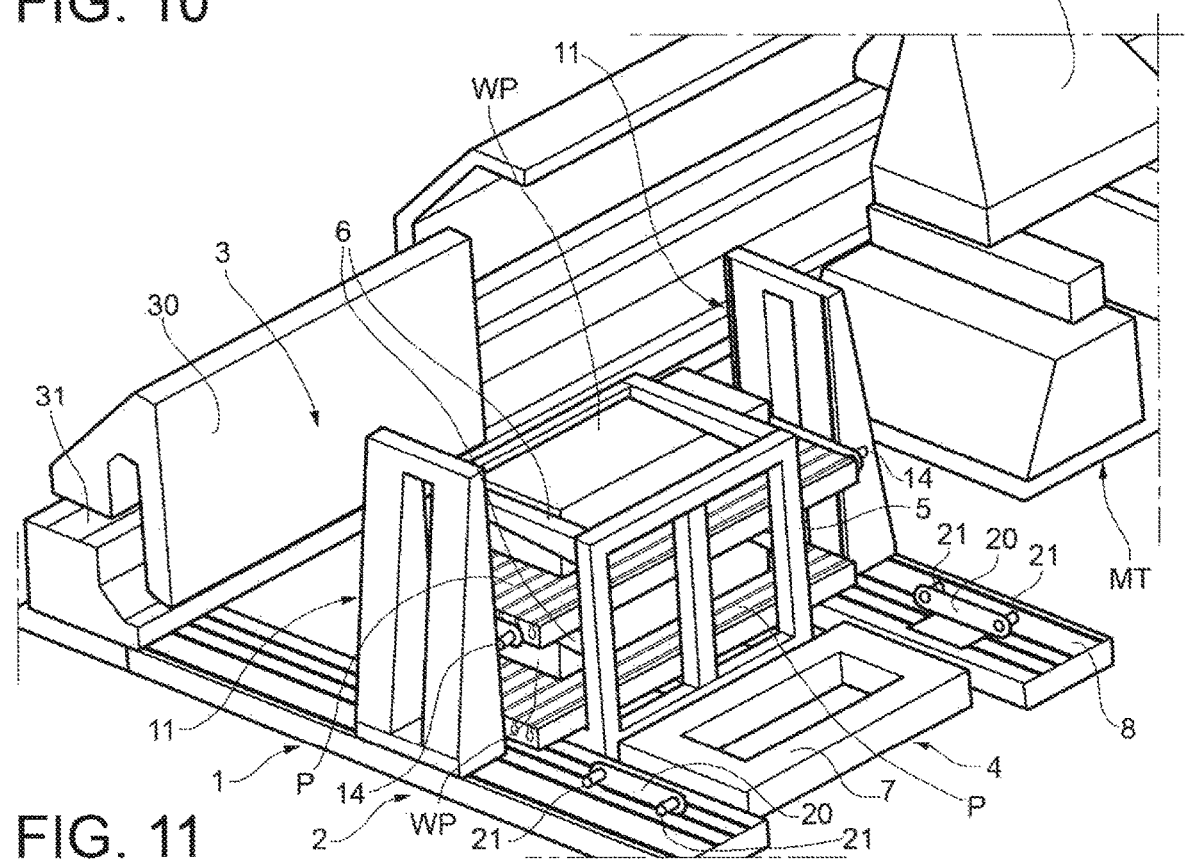
Figure 12:
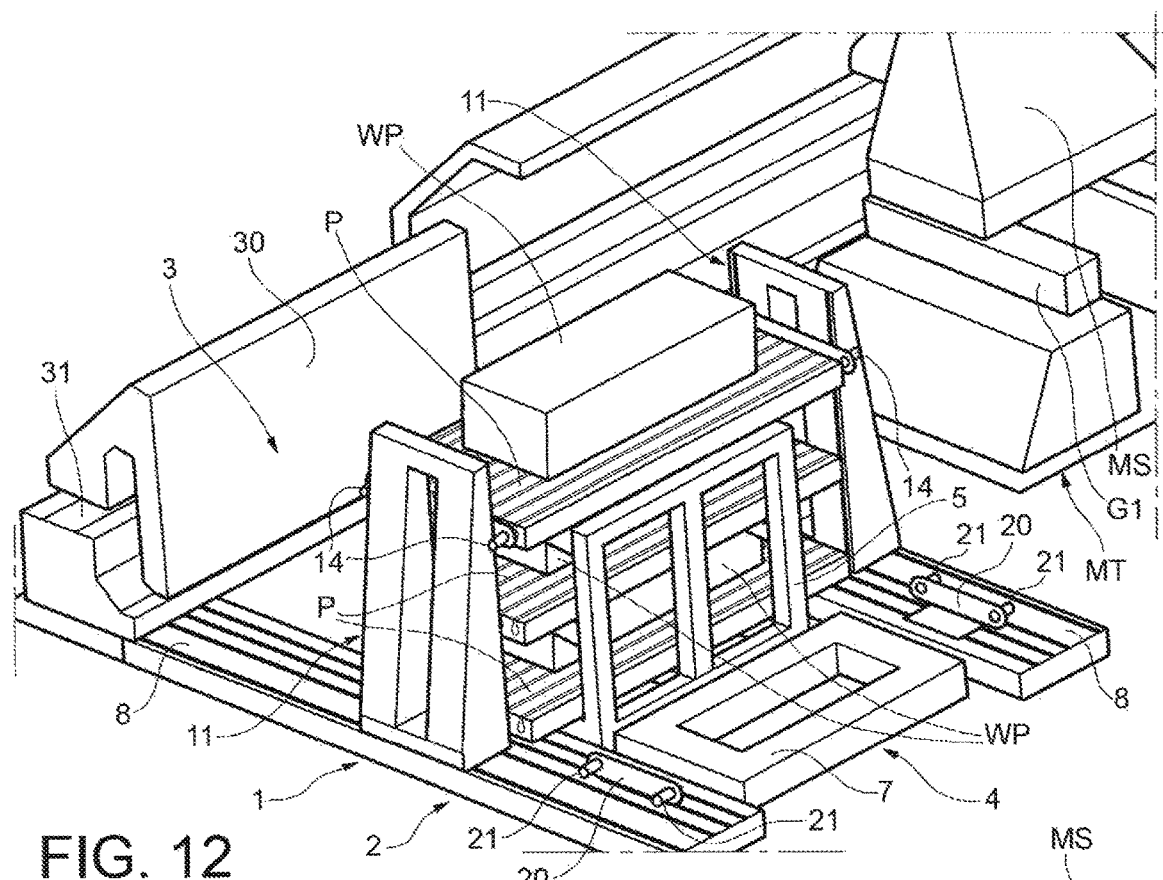

By proceeding in the above-described manner, further pallets P, each carrying a respective workpiece WP to be machined, are placed one after the other on the remaining support shelves 6 of the rack 5 of the bearing structure 4, as shown in FIGS. 11 and 12.

Figure 13:
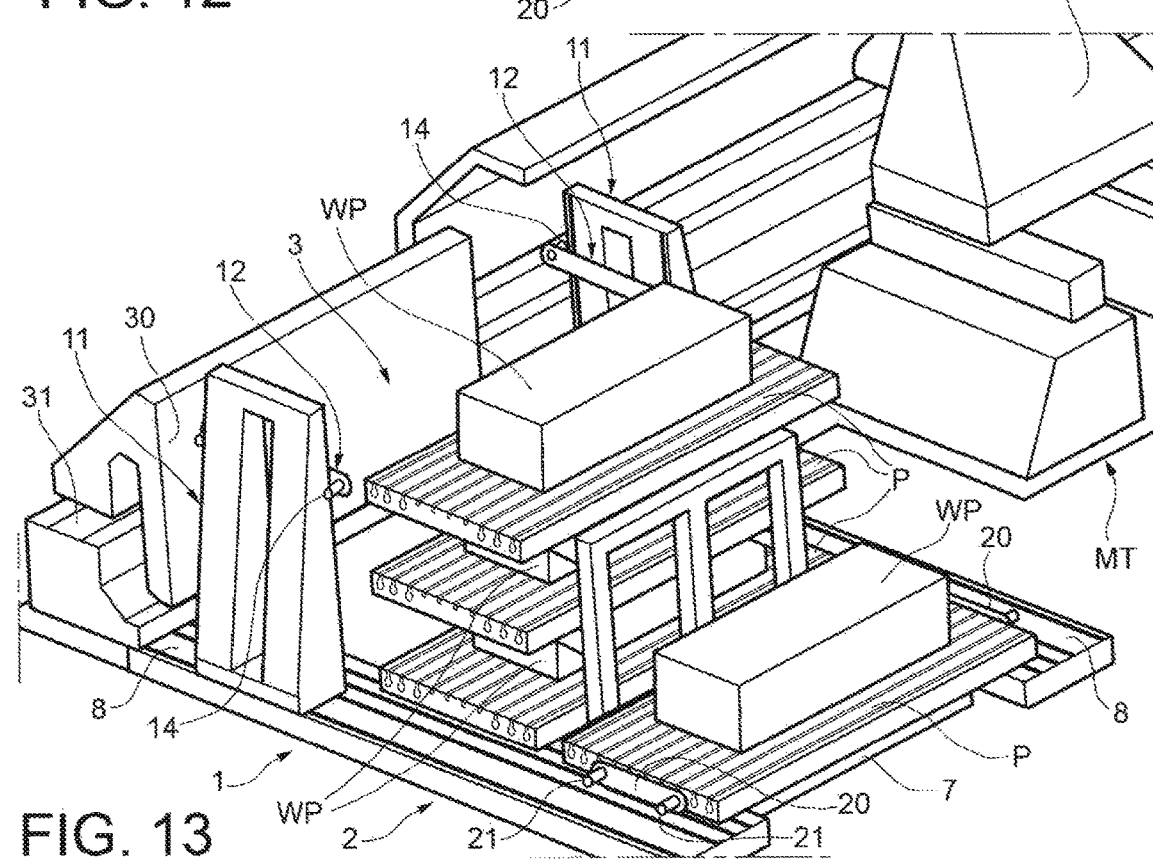
Figure 14:
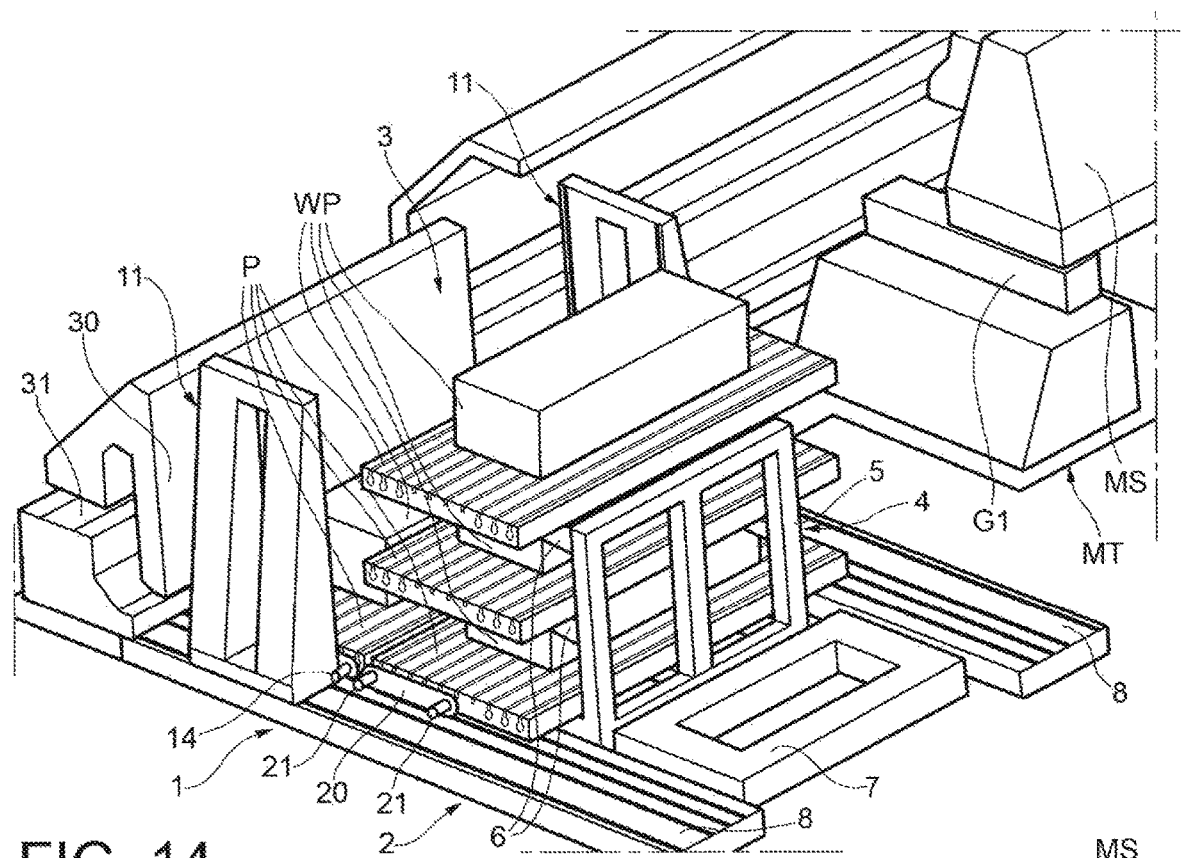

Moreover, a further pallet P carrying a further workpiece WP can then be deposited on the base frame 7 of the bearing structure 4, as shown in FIG. 13, and in the same way as described above this pallet can be transferred to the pallet loading and unloading station 3, as shown in FIG. 14.

The pallet handling unit further comprises a pair of motorized auxiliary carriages 20, which can be jointly translated along the second guide grooves 10 of the horizontal guides 8 between the pallet deposition and pick-up station 2 and the pallet loading and unloading station 3 so as to remain always in facing relationship with one another in the second horizontal direction B-B.

Each auxiliary carriage 20 is provided at its opposite ends with gripping devices 21, similar to the gripping devices 14 of the lifting carriages 12 described above. The distance between the axes of the gripping devices 21 of the auxiliary carriages 20 is equal to the distance between the axes of the holes 17 on the opposite sides of each pallet P (FIG. 4). The gripping devices 21 can be activated and deactivated either selectively or jointly.

The function of the auxiliary carriages 20, as well as the way they cooperate with the lifting carriages 12 of the uprights 11, will be better explained below.

The pallet handling unit further comprises a motorized transporting carriage 30 for carrying and transporting each time, in a vertical attitude, one pallet P and the workpiece WP to be machined connected thereto. The transporting carriage 30 is mounted on a horizontal guide 31 for sliding movement between the pallet loading and unloading station 3 and the working area WS of the machine tool MT along the second horizontal direction B-B (see in particular FIG. 1).

The pallet changing system 1 further comprises an electronic control unit including a controller 40 (FIG. 1). The controller 40 is coupled with a plurality of sensors associated to the pallet changing system, for example position sensors associated to the lifting carriages 12, to the uprights 11, to the auxiliary carriages 20, etc.

The controller 40 is also coupled with the motors of the uprights 11, of the lifting carriages 12, of the auxiliary carriages 20 and of the transporting carriage 30. The controller 40 is also coupled with the gripping devices 14 of the lifting carriages 12 and the gripping devices 21 of the auxiliary carriages 20. The controller 40 may be arranged to interface and exchange data, advantageously in automatic manner, with the controller of the machine tool MT.

The controller 40 is arranged to manage the operation of the pallet changing system 1 according to predetermined modes, in particular in such a manner as to carry out (at least) the following phases:

a first transfer phase wherein, by means of the lifting carriages 12, the uprights 11 pick one or more pallets P carrying respective workpiece(s) WP to be machined from the pallet deposition and pick-up station 2, and then transfer the pallet(s) P to the rack 5 of the bearing structure 4;

a loading phase wherein, by means of the lifting carriages 12, the uprights 11 pick one or more pallets P and the workpiece(s) WP to be machined connected thereto from the rack 5 of the bearing structure 4 and transfer the pallet(s) P to the pallet loading and unloading station 3 where, in cooperation with the auxiliary carriages 20, each pallet P is rotated and loaded on the transporting carriage 30 in a vertical attitude; this phase will be described in more detail below;

an outward transport phase wherein the transporting carriage 30 transfers a pallet P and the associated workpiece WP to be machined, in a vertical attitude, to the working area WS of the machine tool MT;

a return transport phase wherein the transporting carriage 30 transfers a pallet P with the associated machined workpiece (indicated MWP in FIGS. 18 to 30) from the working area WS of the machine tool MT to the pallet loading and unloading station 3;

an unloading phase wherein, by means of the lifting carriages 12, the uprights 11 pick the pallet P with the machined workpiece MWP from the transporting carriage 30 and, in cooperation with the auxiliary carriages 20, cause rotation of the pallet P from vertical to horizontal; and a second transfer phase wherein the uprights 11 transfer, in a horizontal attitude, the pallet P and the associated machined workpiece MWP back to the rack 5 of the bearing structure 4.

A part of a possible operating cycle of the pallet changing system 1, up to the condition illustrated in FIG. 14, has already been described in detail above: in such a condition a pallet P carrying a respective workpiece WP to be machined has been placed on each support shelf 6 of the rack 5 of the bearing structure 4, and a further pallet P has also been placed in a lowered position in the pallet loading and unloading station 3, said pallet P being still engaged by the gripping devices 14 of the lifting carriages 12 of the uprights 11.

Figure 15:
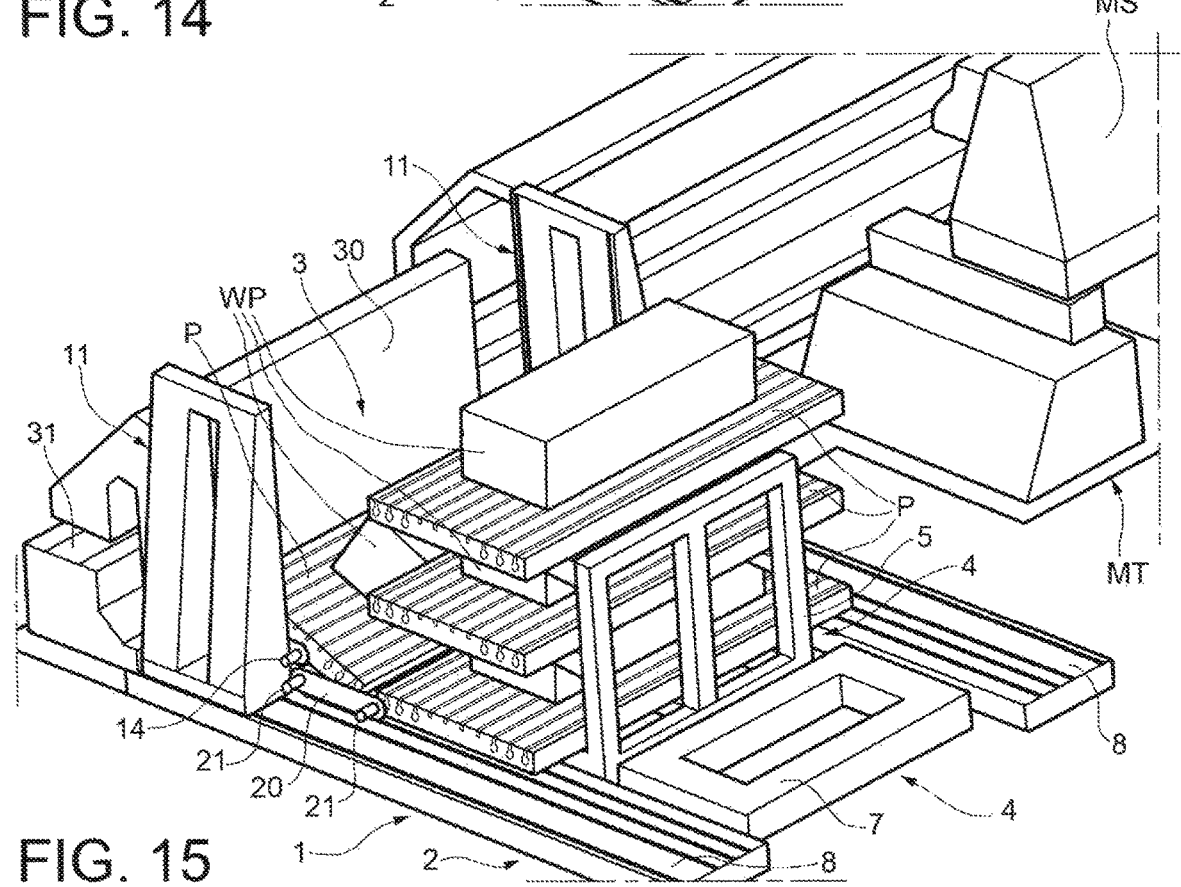
Figure 16:
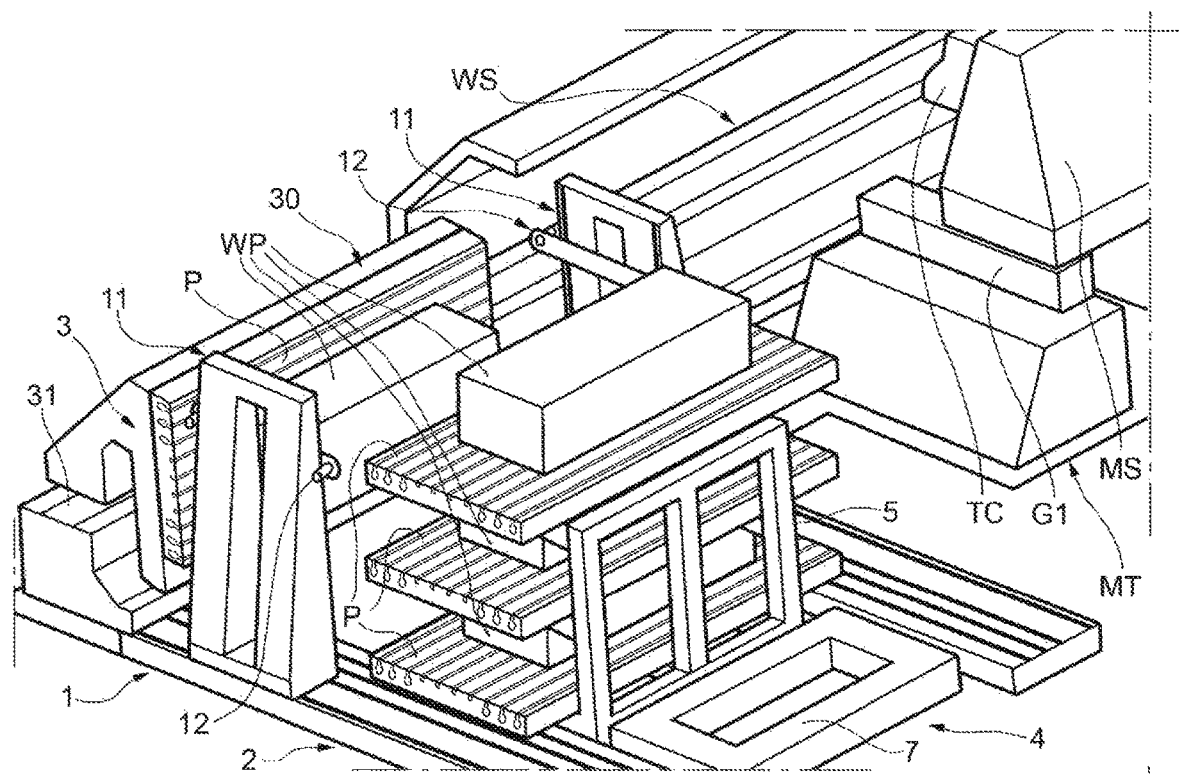

With reference to FIGS. 14 to 16, in the pallet loading and unloading station 3 a pallet P with the associated workpiece WP to be machined is caused to rotate from horizontal to vertical in the following manner.

In the condition of FIG. 14, the auxiliary carriages 20 are moved on the horizontal guides 8 close to the uprights 11 and to the end of the pallet P facing towards the bearing structure 4. The gripping devices 14 associated to said end of the pallet P are then deactivated, i.e. disengaged from said end of the pallet, while the gripping devices 14 associated to the opposite end of the pallet P are still engaged in the holes 16 of the pallet. The auxiliary carriages 20 are then moved towards the transporting carriage 30, until the gripping devices 21 thereof facing the pallet P are aligned with the holes 17 at the end of the pallet P facing the bearing structure 4. Said gripping devices 21 are then activated, in order for their rods to engage in said holes 17 of the pallet P. In such a condition, the end of the pallet P facing the transporting carriage 30 is still engaged by the gripping devices 14 of the lifting carriages 12 of the uprights 11, while the opposite end of the pallet P is now engaged by the gripping devices 21 of the auxiliary carriages 20.

By means of a coordinated upward movement of the lifting carriages 12 along the uprights 11 and a further translation of the auxiliary carriages 20 towards the transporting carriage 30, the pallet P is progressively rotated from the horizontal-attitude position shown in FIG. 14 to the vertical-attitude position shown in FIG. 16, passing through a plurality of intermediate angular positions, one of which is shown in FIG. 15.

The pallet P and the associated workpiece WP to be machined may then be lifted and moved horizontally by means of the uprights 11, until they are loaded onto the transporting carriage 30, in a vertical attitude (FIG. 16).

Figure 17:
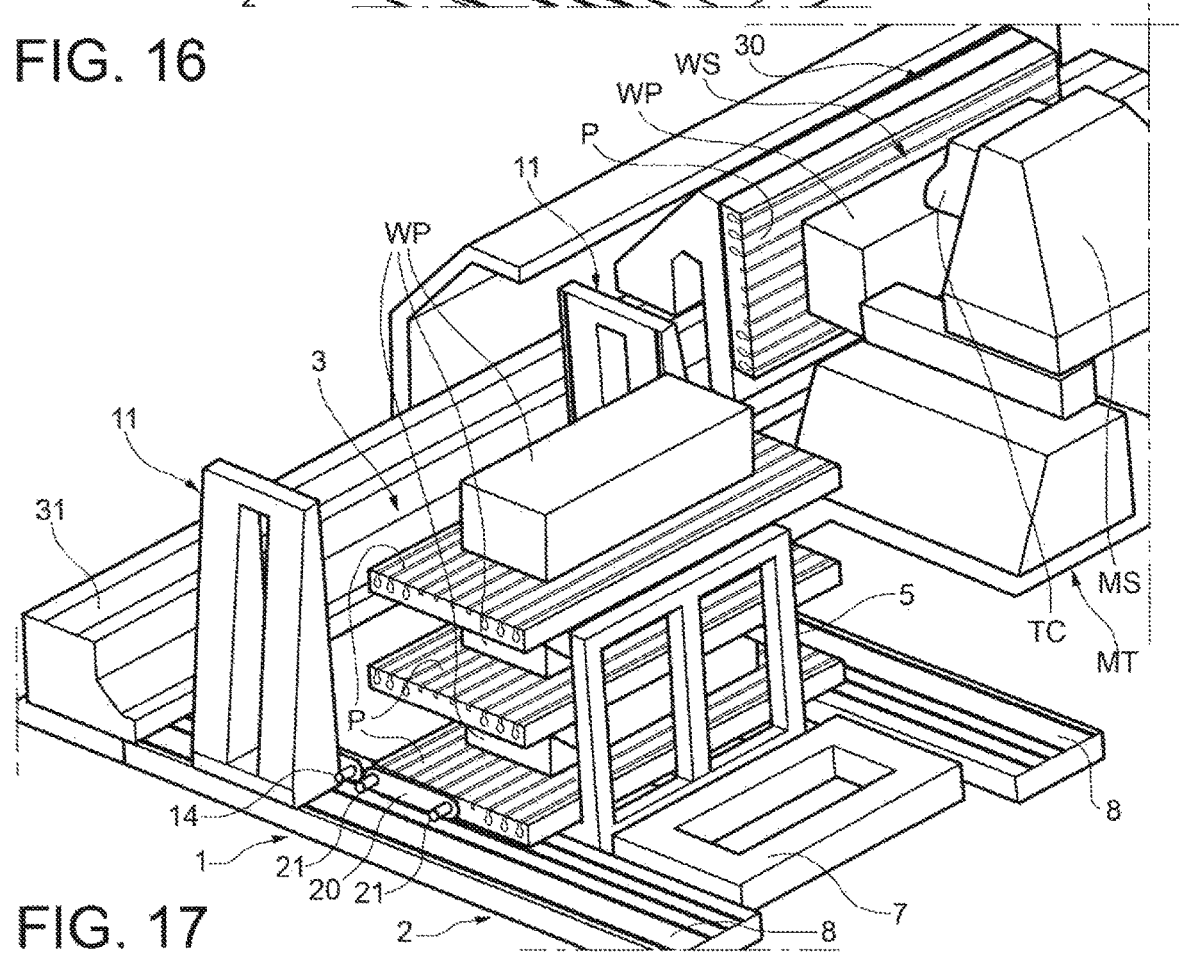
Figure 18:
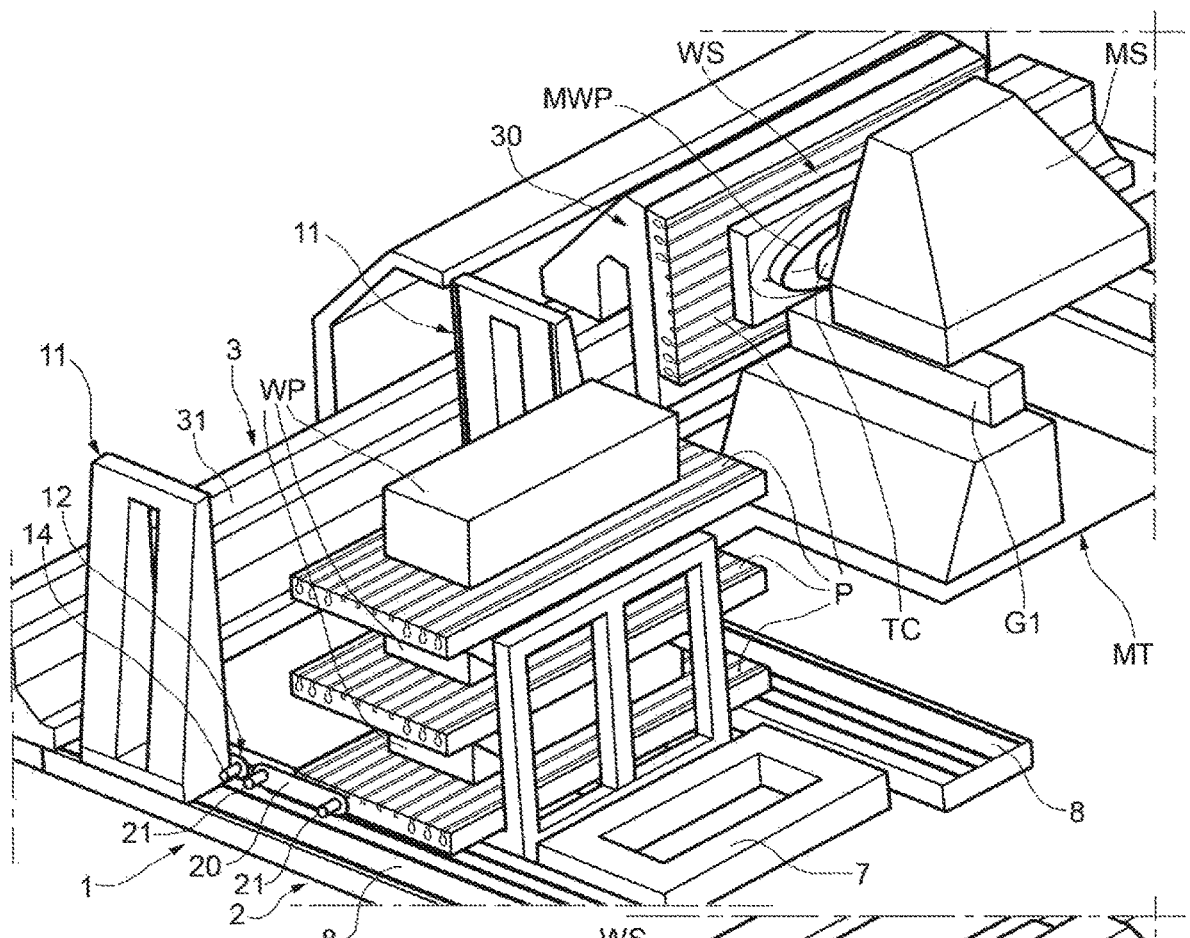
Figure 19:
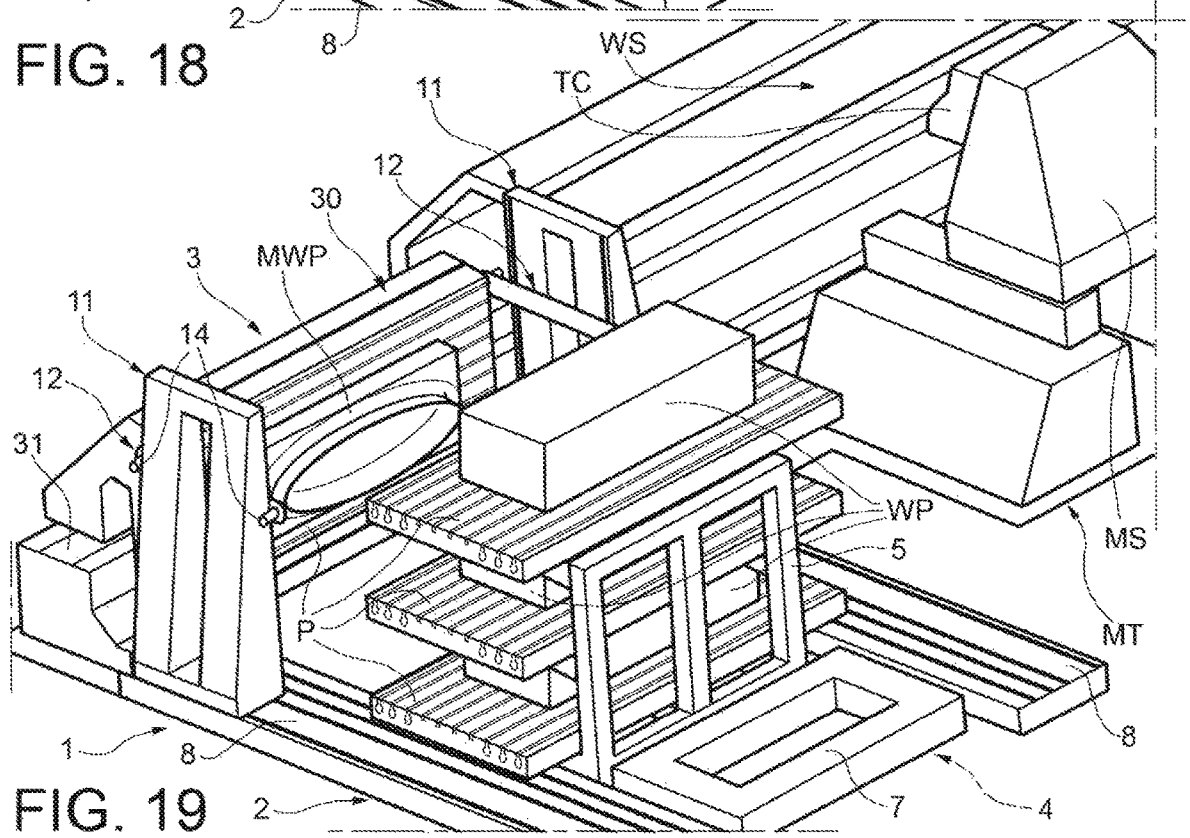
Figure 20:
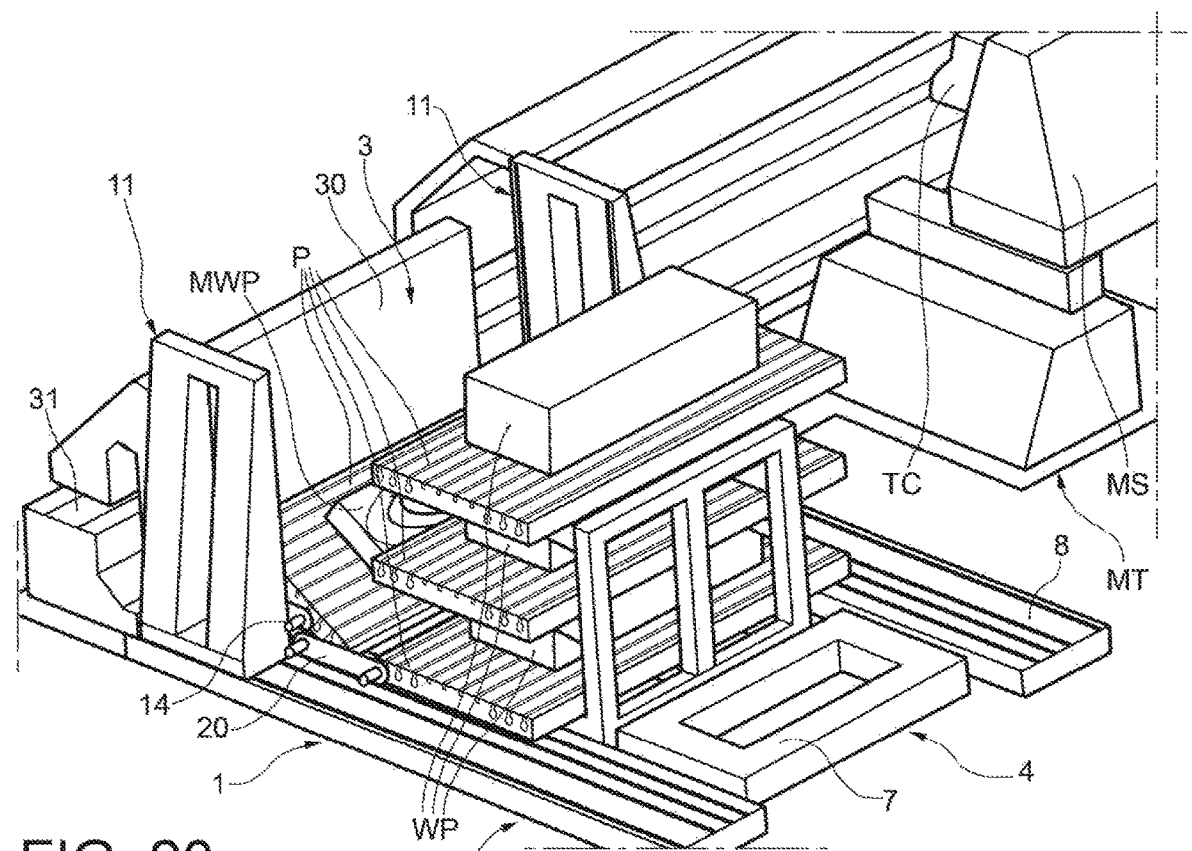

As shown in FIG. 17, the controller 40 of the electronic control unit controls at this time the translation of the transporting carriage 30 from the pallet loading and unloading station 3 to the working area WS of the machine tool MT, where the workpiece WP is machined, for example milled, by the machine tool MT (see FIG. 18). Once machining has been completed, the controller 40 controls the return movement of the transporting carriage 30, carrying the pallet P with the machined workpiece MWP, still in a vertical attitude, back to the pallet loading and unloading station 3, as shown in FIG. 19.

The pallet P and the machined workpiece MWP can then be unloaded from the transporting carriage 30 and deposited again between the uprights 11, according to substantially the same procedure, although in the opposite order, as that previously carried out during the loading phase on the transporting carriage 30, by means of coordinated movements of the lifting carriages 12 and of the auxiliary carriages 20, as well as of the respective gripping devices 14 and 21.

The pallet P with the machined workpiece MWP is thus brought, in a horizontal attitude, between the uprights 11 in the pallet loading and unloading station 3 and then the gripping devices 21 of the auxiliary carriages 20 are disengaged from the corresponding holes 17 of the pallet P, while the gripping devices 14 of the lifting carriages 12 are again engaged in the holes 16 at the end of the pallet P facing towards the bearing structure 4.

Figure 21:
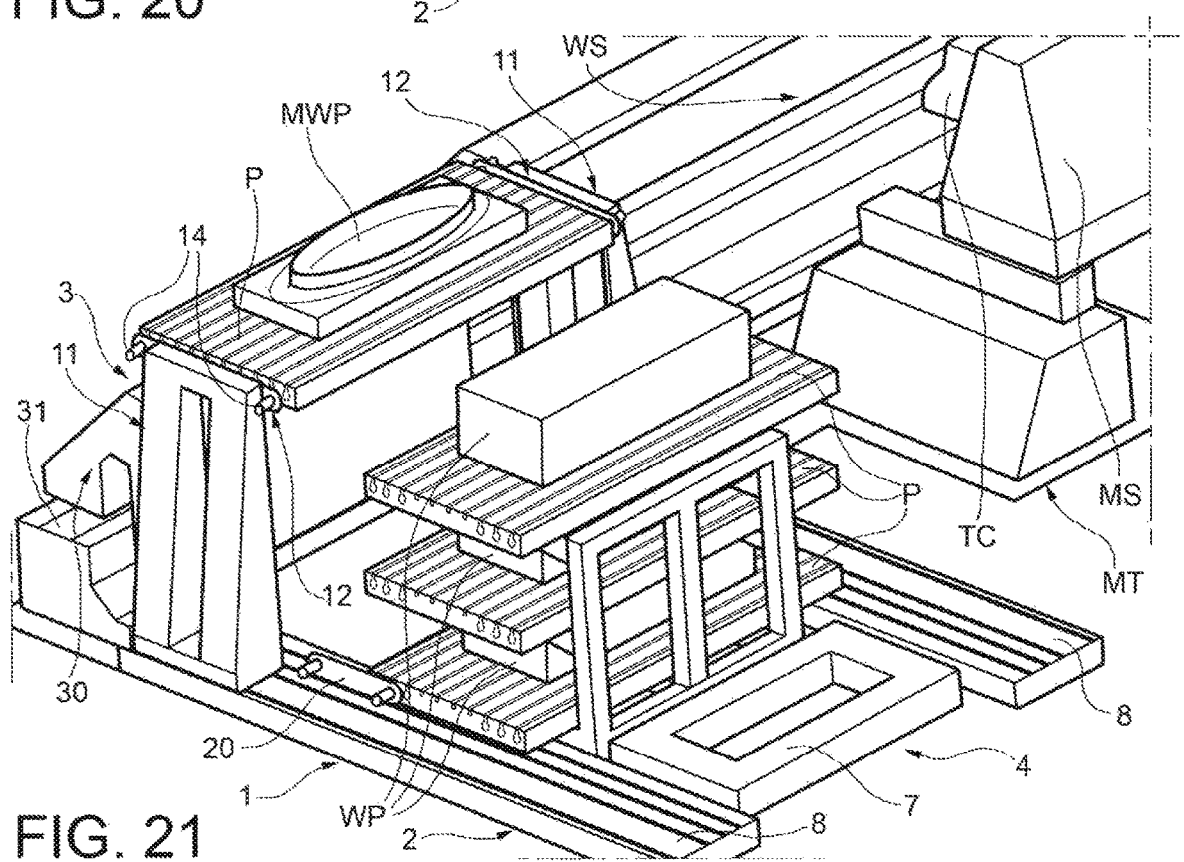
Figure 22:
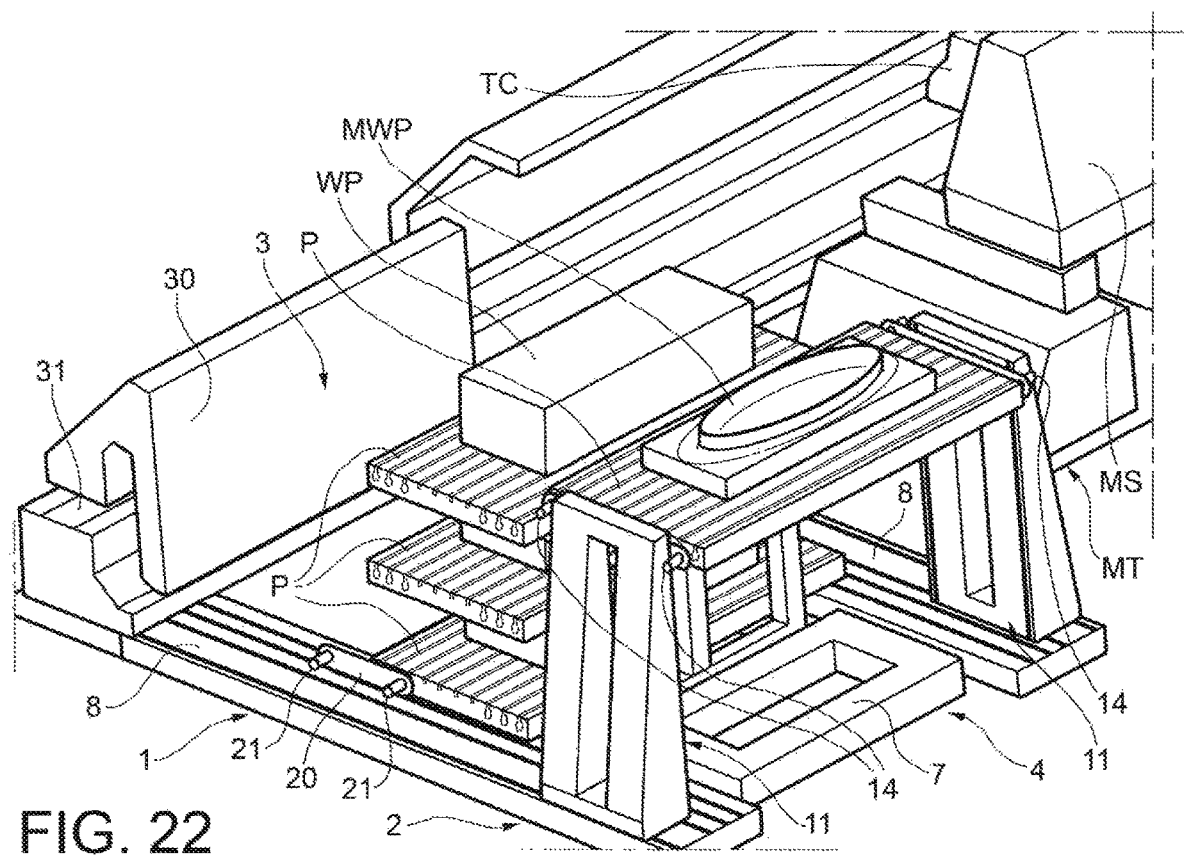

The pallet P with the machined workpiece MWP can then be raised vertically, while being still kept in a horizontal attitude, as shown in FIG. 21, and subsequently transferred to the pallet deposition and pick-up station 2, as shown in FIG. 22, by means of joint translation of the uprights 11.

Figure 23:
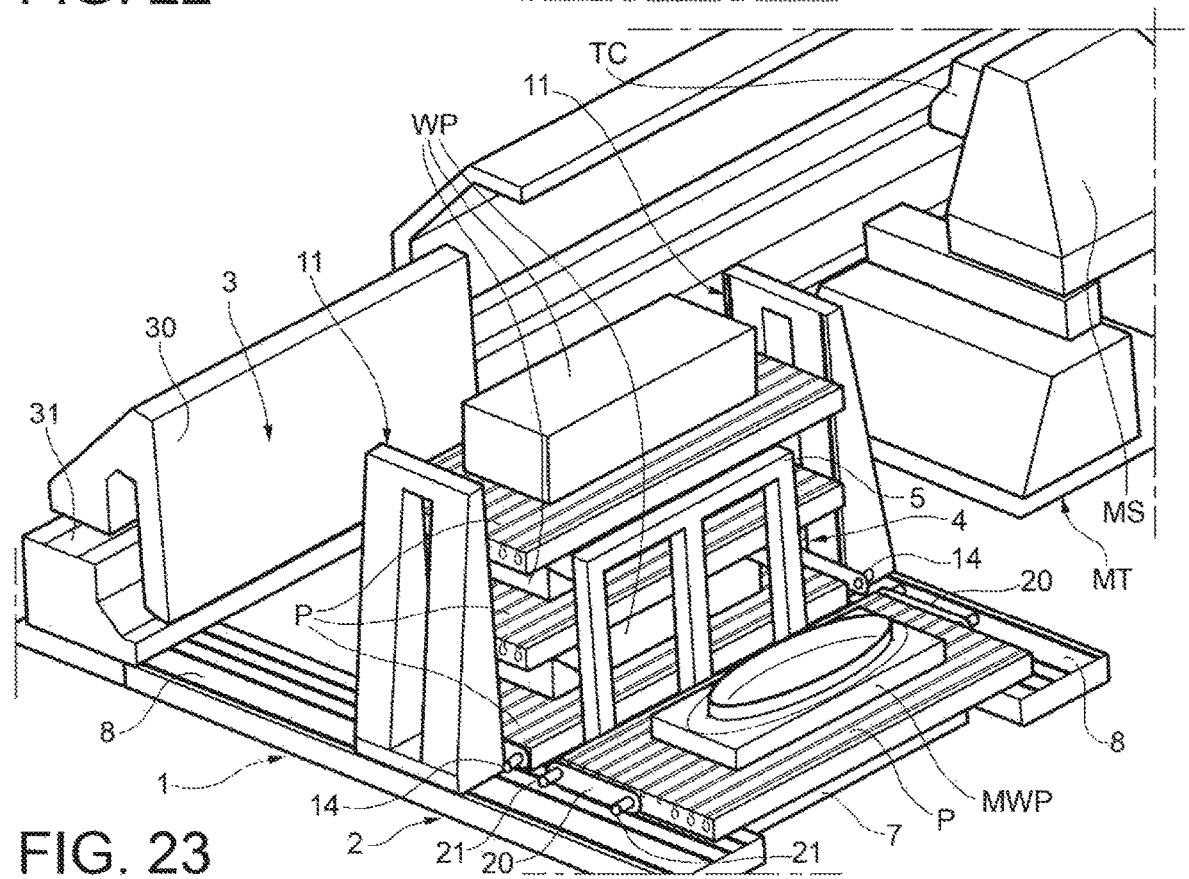

The pallet P with the machined workpiece MWP can then be lowered and deposited on the base frame 7 of the bearing structure 4, as shown in FIG. 23, while the uprights 11 are moved next to the pallets P stored in the rack 5 of the bearing structure 4.

Figure 24:
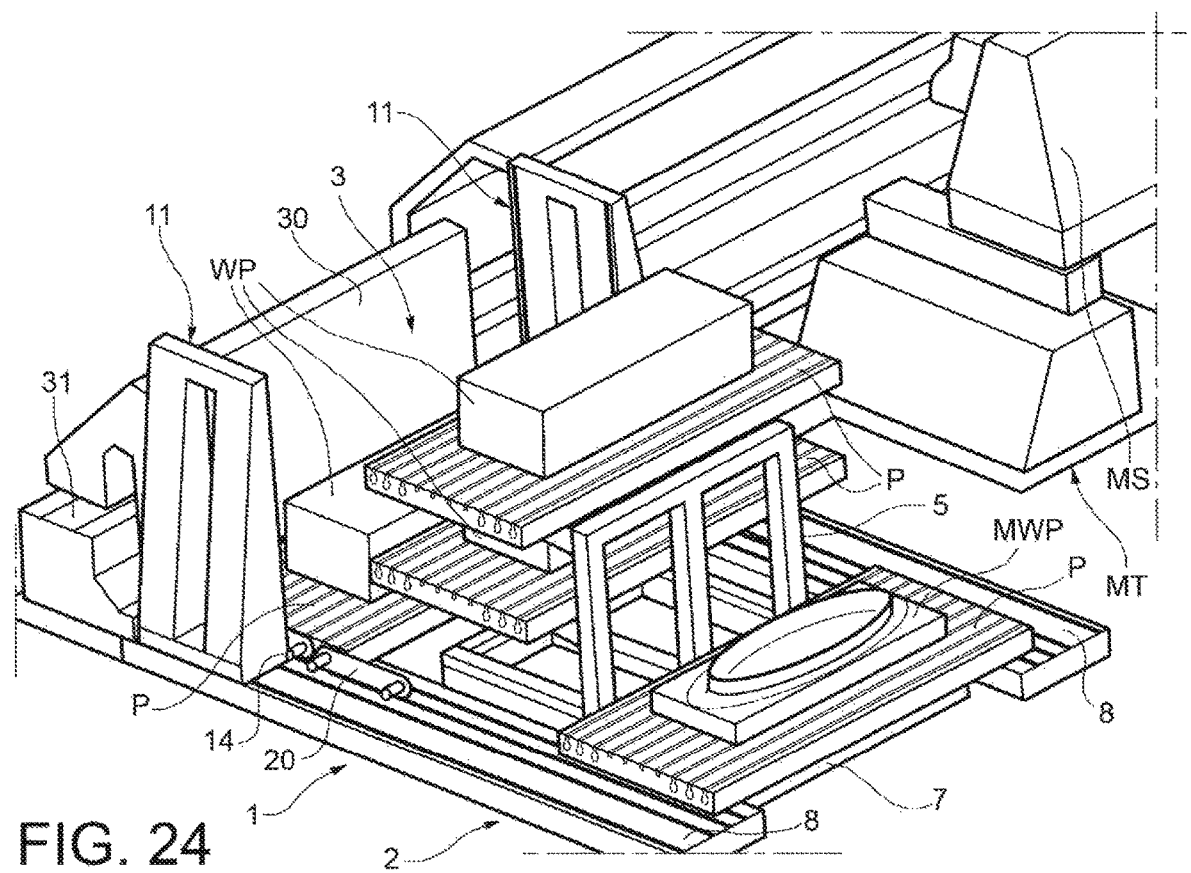

The lifting carriages 12 of the uprights 11 are then controlled to engage one of the pallets P stored in the rack 5, for example the lowermost pallet P. This pallet P, along with the associated workpiece WP to be machined, is then transferred to the pallet loading and unloading station 3, as shown in FIG. 24.

Figure 25:
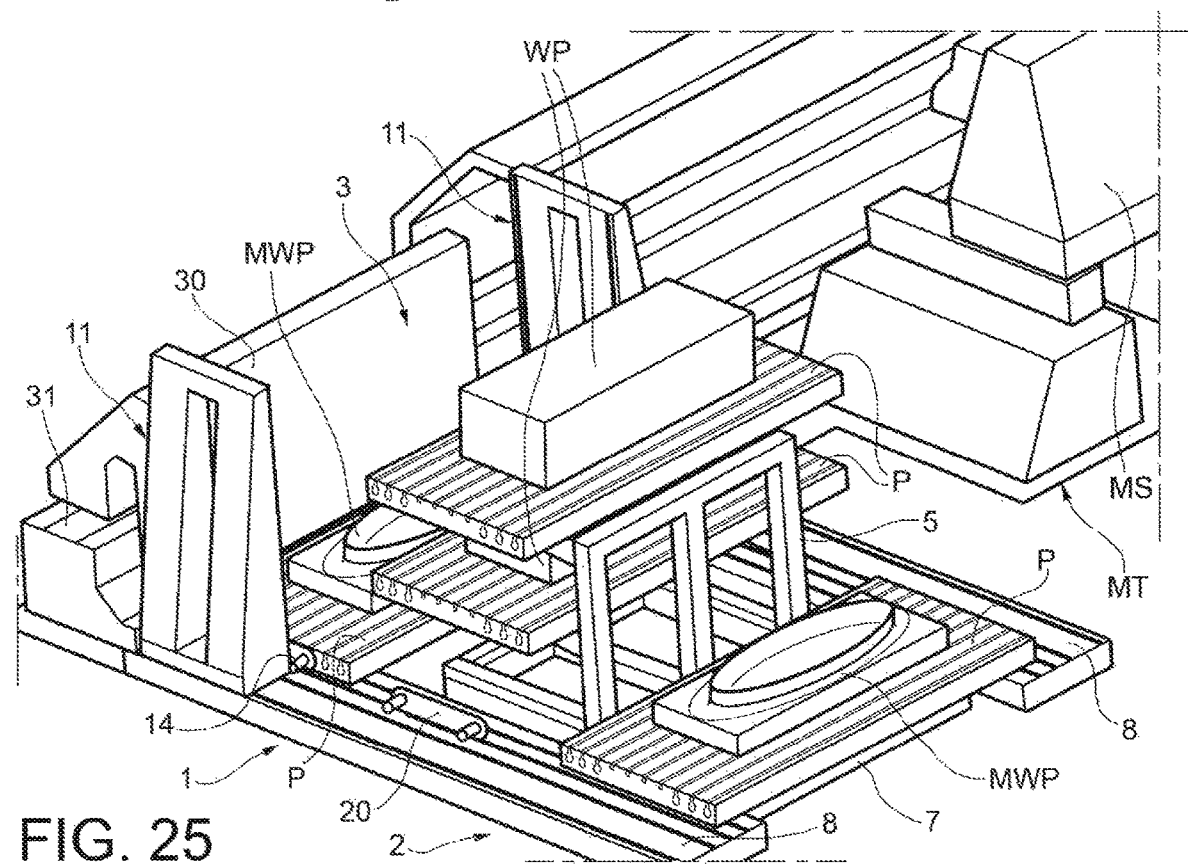

As already described above, this pallet P and the associated workpiece WP to be machined are then transferred, in a vertical attitude, to the working area WS of the machine tool MT and, once the workpiece has been machined, moved back to the pallet loading and unloading station 3, where they are unloaded from the transporting carriage 30 and rotated from vertical to horizontal to be then engaged by all the gripping devices 14 of the lifting carriages 12 of the uprights 11 (FIG. 25).

Figure 26:
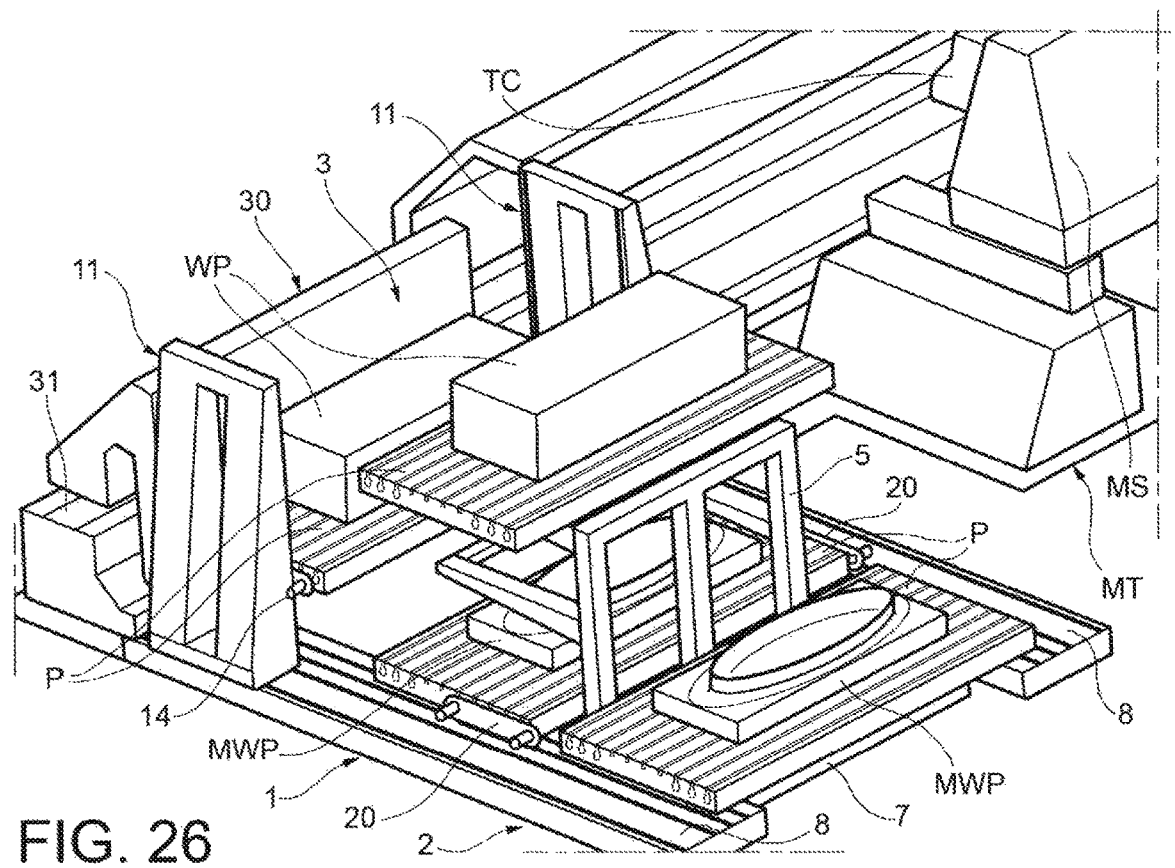
Figure 27:
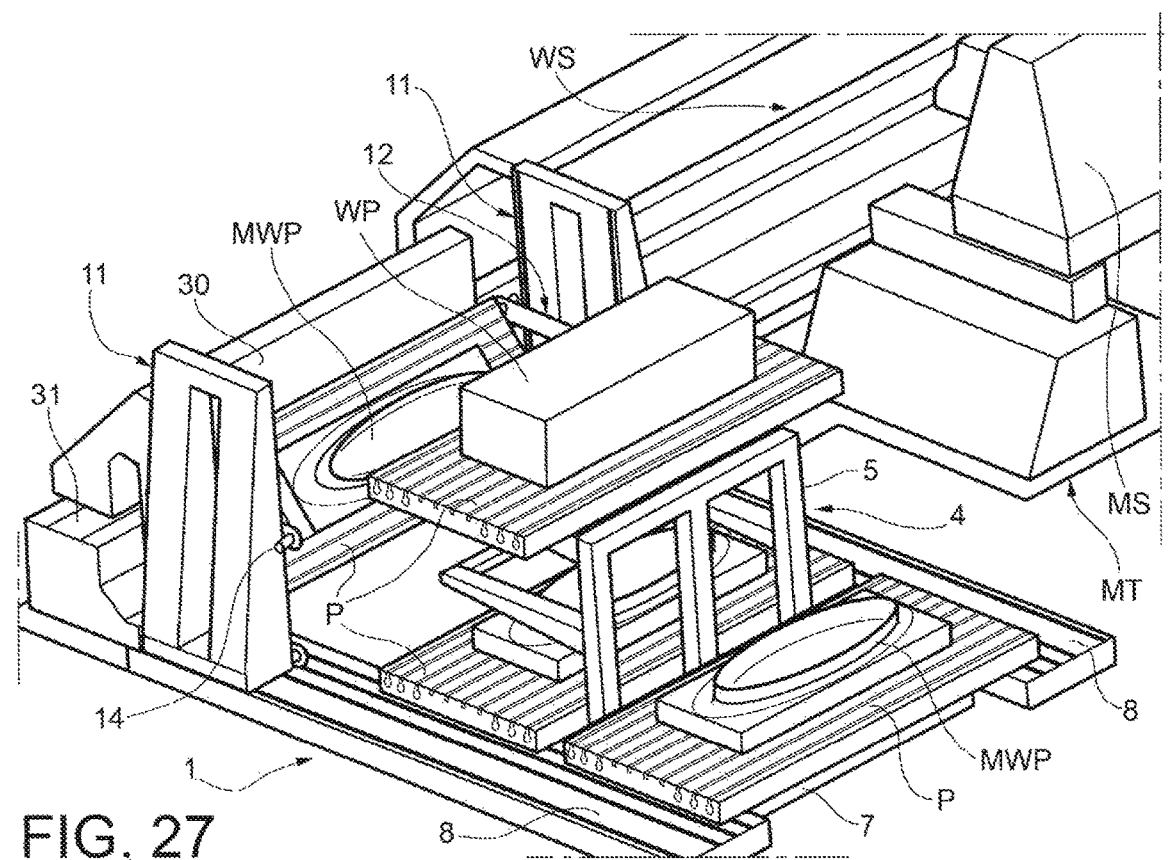

This pallet P, with the machined workpiece MWP, is then placed back onto the support shelf 6 of the rack 5 from which it had been previously taken and a new pallet P with a workpiece WP to be machined is then picked from the rack 5 and transferred to the pallet loading and unloading station 3 (FIG. 26).

In the same manner as already explained above, the pallet P with the new workpiece WP to be machined is transferred to the working area WS of the machine tool MT. Once machining has been completed, the machined workpiece MWP is brought back to the pallet loading and unloading station 3, where it is unloaded from the transporting carriage 30 and deposited, in a horizontal attitude, on the support shelf 6 of the rack 5 from which it had been previously taken.

Figure 28:
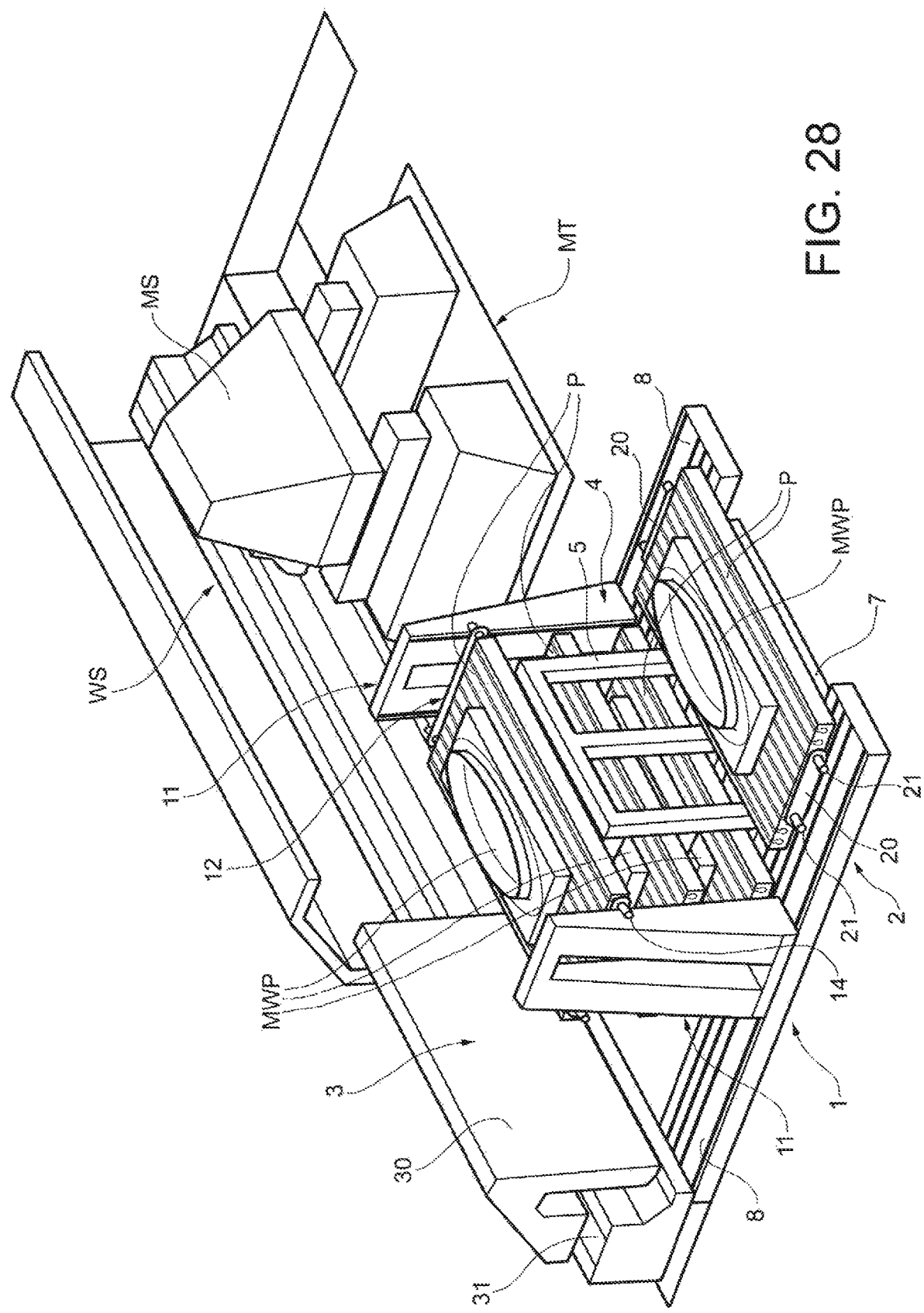
Figure 29:
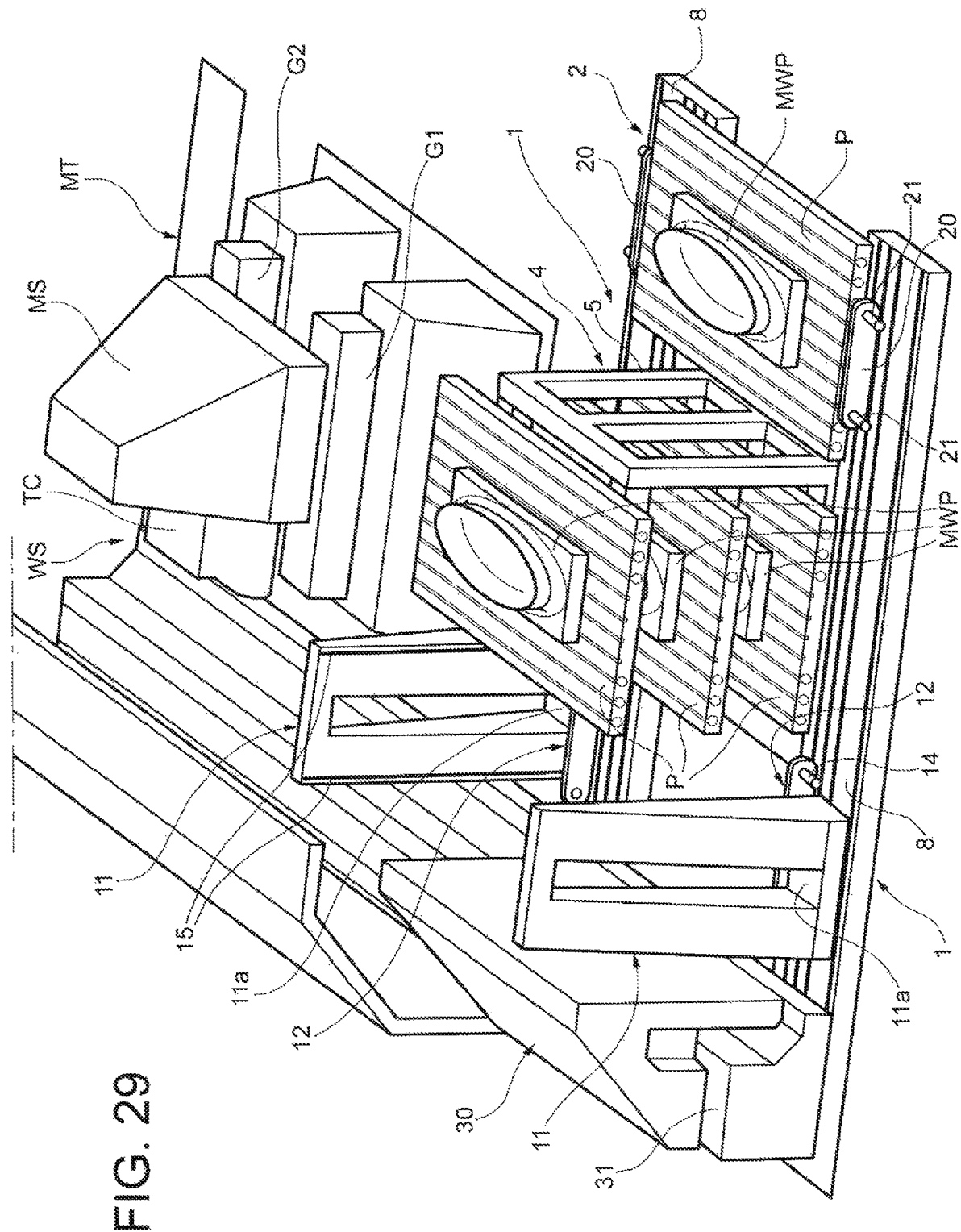
FIG. 29 is a perspective view showing the pallet changing system of FIG. 1 in the configuration taken at the end of the operating cycle.

The operating cycle goes on until all the workpieces WP to be machined have been brought to the working area WS of the machine tool MT and, once machined, returned to the rack 5 of the bearing structure 4 (FIGS. 28 and 29).

At the end of the operating cycle, the uprights 11 can be brought back to the pallet loading and unloading station 3 (FIG. 29), in view of the beginning of another operating cycle.

The operating cycle of the pallet changing system has been described above purely by way of example. As a matter of fact, the number of pallets and workpieces may differ from the one described above, and also the way the pallets are transferred to the working area of the machine tool may be carried out according to other modes than the one described above. In an alternative embodiment of the invention (not shown), the pallet changing system may have no bearing structure acting as pallet storage structure: in such a case, a pallet with the associated workpiece may be transferred, in a horizontal attitude, directly from the pallet deposition and pick-up station to the pallet loading and unloading station, and in this station it may be rotated from horizontal to vertical and then placed onto the transporting carriage, in the same way as described above, to be subsequently transferred to the working area of the machine tool. Once machining has been completed, the pallet with the machined workpiece is brought back to the pallet loading and unloading station, where it is rotated from vertical to horizontal, in the same way as described above, and then transferred, in a horizontal attitude, to the pallet deposition and pick-up station.

In other embodiments of the invention, a second pallet changing system (with or without the bearing structure acting as pallet storage structure) as described above may be arranged on the opposite side of the machine tool with respect to the first pallet changing system. In this case, the first and second pallet changing systems may be operated so as to alternatively transfer pallets (with the associated workpieces to be machined) to the working area of the machine tool.

Naturally, the principle of the invention remaining unchanged, the embodiments and constructional details may vary widely from those described and illustrated purely by way of non-limiting example, without thereby departing from the scope of the invention as defined in the enclosed claims.

The invention claimed is:

1. A pallet changing system for a machine tool (MT), comprising
   a pallet deposition and pick-up station and a pallet loading and unloading station, horizontally spaced from one another along a first horizontal direction (A-A);
   a pallet handling unit, including
      horizontal guides extending along said first horizontal direction (A-A) between the pallet deposition and pick-up station and the pallet loading and unloading station,
      a pair of motorized uprights, which are jointly movable in a controlled manner in said first horizontal direction (A-A) along said horizontal guides between the pallet deposition and pick-up station and the pallet loading and unloading station, each upright being provided with a respective motorized lifting carriage vertically movable in a controlled manner, each lifting carriage being provided with a respective pair of gripping devices which are horizontally spaced from one another and selectively or jointly controllable to engage a corresponding end of a pallet (P) so as to allow rotation of the pallet (P) about a first horizontal axis,
      a pair of motorized auxiliary carriages, which are jointly movable in said first horizontal direction (A-A) along said horizontal guides between the pallet deposition and pick-up station and the pallet loading and unloading station, and are provided each with a gripping device arranged to engage a corresponding end of said pallet (P) facing the pallet deposition and pick-up station, so as to allow rotation of said pallet (P) about a second horizontal axis parallel to said first horizontal axis, and
      a motorized transporting carriage which is arranged to transport, in a vertical attitude, said pallet (P) along with a workpiece (WP) connected to said pallet (P), and is movable between the pallet loading and unloading station and a working area (WS) of the machine tool (MT) in a second horizontal direction (B-B) forming an angle with respect to said first horizontal direction (A-A); and
   an electronic control unit arranged to control the pallet handling unit according to predetermined operating modes, so as to carry out:
      a first transfer phase wherein, by means of the lifting carriages, the uprights pick said pallet (P), along with the respective workpiece (WP), from the pallet deposition and pick-up station and transfer the same, in a horizontal attitude, to the pallet loading and unloading station,
      a loading phase wherein, by means of the lifting carriages and the auxiliary carriages, the pallet (P) that has been transferred to the pallet loading and unloading station is rotated from said horizontal attitude to a vertical attitude and loaded onto the transporting carriage in said vertical attitude,
      an outward transport phase wherein the transporting carriage transfers said pallet (P) with the associated workpiece (WP), in the vertical attitude, the working area (WS) of the machine tool (MT), wherein the associated workpiece (WP) is machined,
      a return transport phase wherein the transporting carriage transfers said pallet (P) with the associated machined workpiece (MWP) from the working area (WS) of the machine tool (MT) to the pallet loading and unloading station,
      an unloading phase wherein, by means of the lifting carriages, the uprights pick said pallet (P) with the associated machined workpiece (MWP) from the transporting carriage and, in cooperation with the auxiliary carriages, cause rotation of said pallet (P) from the vertical attitude to the horizontal attitude, and
      a second transfer phase wherein the uprights transfer said pallet (P) with the associated machined workpiece (MWP), in the horizontal attitude, to the pallet deposition and the pick-up station in said first horizontal direction (A-A) along said horizontal guides.

2. The pallet changing system of claim 1, further comprising a stationary bearing structure which is arranged between the pallet deposition and the pick-up station and the pallet loading and unloading station and includes a rack having a plurality of horizontal support shelves arranged vertically one over the other and adapted each to receive and bear in the horizontal attitude a respective pallet (P) with a respective workpiece (WP) connected to the respective pallet (P).

3. The pallet changing system of claim 2, wherein the said horizontal guides are arranged on opposite sides of the bearing structure.

4. The pallet changing system of claim 2, wherein the electronic control unit is arranged to control the operation of the pallet handling unit in such a manner that
   in said first transfer phase, the uprights pick one or more subsequent pallets (P), each carrying a respective workpiece (WP) to be machined, and transfer the same to the rack of the bearing structure,
   in said loading phase, the uprights pick said one or more subsequent pallets (P) from the rack of the bearing structure and transfer the same to the pallet loading and unloading station where, in cooperation with the auxiliary carriages, each pallet (P) is rotated and loaded onto the transporting carriage in the vertical attitude, and
   in said second transfer phase, the uprights transfer said one or more subsequent pallets (P) with the respective machined workpiece (MWP), in the horizontal attitude, to the rack of the bearing structure.

5. The pallet changing system of claim 3, wherein the electronic control unit is arranged to control the operation of the pallet handling unit in such a manner that
   in said first transfer phase, the uprights pick one or more subsequent pallets (P), each carrying a respective workpiece (WP) to be machined, and transfer the same to the rack of the bearing structure,
   in said loading phase, the uprights pick said one or more subsequent pallets (P) from the rack of the bearing structure and transfer the same to the pallet loading and unloading station where, in cooperation with the auxiliary carriages, each pallet (P) is rotated and loaded onto the transporting carriage in the vertical attitude, and
   in said second transfer phase, the uprights transfer said one or more subsequent pallets (P) with the respective machined workpiece (MWP), in the horizontal attitude, to the rack of the bearing structure.

6. A machine tool assembly comprising a machine tool (MT) and a pallet changing system according to claim 1.

7. The machine tool assembly of claim 6, further comprising a second pallet changing system, wherein both pallet changing systems are arranged on opposite sides of the machine tool (MT).

\* \* \* \* \*